(12) United States Patent
Tunstall-Pedoe

(10) Patent No.: US 7,013,308 B1
(45) Date of Patent: Mar. 14, 2006

(54) KNOWLEDGE STORAGE AND RETRIEVAL SYSTEM AND METHOD

(75) Inventor: William Tunstall-Pedoe, Cambridge (GB)

(73) Assignee: Semscript Ltd., Cambridge (GB)

( * ) Notice: Subject to any disclaimer, the term of this patent is extended or adjusted under 35 U.S.C. 154(b) by 532 days.

(21) Appl. No.: 09/990,188

(22) Filed: Nov. 21, 2001

Related U.S. Application Data

(60) Provisional application No. 60/253,679, filed on Nov. 28, 2000.

(51) Int. Cl.
*G06F 17/30* (2006.01)

(52) U.S. Cl. ............... 707/104.1; 707/102; 707/103 R; 707/3; 707/5

(58) Field of Classification Search ..... 707/100–104.1, 707/3, 5, 4, 1; 706/52
See application file for complete search history.

(56) References Cited

U.S. PATENT DOCUMENTS

| | | | |
|---|---|---|---|
| 5,809,493 A * | 9/1998 | Ahamed et al. ............... 706/52 |
| 6,263,335 B1 * | 7/2001 | Paik et al. ...................... 707/5 |
| 6,377,944 B1 * | 4/2002 | Busey et al. .................... 707/3 |
| 6,446,081 B1 * | 9/2002 | Preston ..................... 707/104.1 |
| 2005/0144000 A1 | 6/2005 | Yamasaki et al. ........... 704/242 |

FOREIGN PATENT DOCUMENTS

WO    WO 00/57302    9/2000

OTHER PUBLICATIONS

Cycorp, Features of CycL, Sep. 27, 2001, http://www.cyc.com/cycl.html, pp. 1-59.
American National Standard, Knowledge Interchange Format, Apr. 10, 2001, http://www.logic.stanford.edu/kif/dpans.html, pp. 1-31.
Douglas B. Lenat, "CYC: A Large-Scale Investment in Knowledge Infrastructure", Communications of the ACM, Nov. 1995, vol. 38, No. 11, pp. 33-38.
George A. Miller, "WordNet: A Lexical Database for English", Communications of the ACM, Nov. 1995, vol. 38, No. 11, pp. 39-41.
Toshio Yokoi, "The EDR Electronic Dictionary", Communications of the ACM, Nov. 1995, vol. 38, No. 11, pp. 42-44.

(Continued)

*Primary Examiner*—Safet Metjahic
*Assistant Examiner*—Sana Al-Hashemi
(74) *Attorney, Agent, or Firm*—Beyer Weaver & Thomas LLP

(57) ABSTRACT

A system and method for representing, storing and retrieving real-world knowledge on a computer or network of computers is disclosed. Knowledge is broken down into permanent atomic "facts" which can be stored in a standard relational database and processed very efficiently. It also provides for the efficient querying of a knowledge base, efficient inference of new knowledge and translation into and out of natural language. Queries can also be processed with full natural language explanations of where the answers came from. The method can also be used in a distributed fashion enabling the system to be a large network of computers and the technology can be integrated into a web browser adding to the browser's functionality.

42 Claims, 21 Drawing Sheets

OTHER PUBLICATIONS

Lenat et al., "CYC, WordNet, and EDR: Critiques and Responses", Communications of the ACM, Nov. 1995, vol. 38, No. 11, pp. 45-48.

Miller et al., "Introduction to WordNet: An On-line Lexical Database", Revised Aug. 1993, pp. 1-9.

Miller, "Nouns in WordNet: A Lexical Inheritance System", Revised Aug. 1993, pp. 10-25.

Fellbaum et al., "Adjectives in WordNet", Revised Aug. 1993, pp. 26-39.

Fellbaum et al., "English Verbs as a Semantic Net", no date, pp. 40-61.

Beckwith et al., "Design and Implementation of the WordNet Lexical Database and Searching Software", no date, pp. 62-82.

Berners-Lee, "Semantic Web Road Map", http://www.w3.org/DesignIssues/Semantic.html, Sep. 1998, pp. 1-9.

Berners-Lee, "What the Semantic Web can represent", http://www.w3.org/DesignIssues/RDFnot.html, Sep. 1998, pp. 1-6.

Resource Description Framework (RDF) Model and Syntax Specification, http://www.w3.org/TP/PR-rdf-syntax/, Jan. 5, 1999, pp. 1-40.

Brachman et al. "Living with CLASSIC: When and How to Use a KL-ONE-Like Language", Principles of Semantic Networks: Explorations in the Representation of Knowledge, 1991, pp. 401-456.

* cited by examiner

KNOWLEDGE STORAGE AND RETRIEVAL SYSTEM AND METHOD

RELATED APPLICATION DATA

The present application claims priority from U.S. Provisional Patent Application No. 60/253,679 for RETRIEVING INFORMATION OVER THE INTERNET USING NATURAL LANGUAGE REPRESENTATION filed on Nov. 28, 2000, the entire disclosure of which is incorporated herein by reference for all purposes.

REFERENCE TO COMPUTER PROGRAM LISTING APPENDIX

A computer program listing appendix has been submitted herewith in accordance with 37 C.F.R. 1.96 and 1.52(e). The computer program listing appendix is stored in duplicate on two CD-ROMs entitled "Computer Program Listing Appendix Copy 1" and "Computer Program Listing Appendix Copy 2," respectively. The entire contents of these CD-ROMs are incorporated herein by reference for all purposes. Each CD-ROM contains a Microsoft Word file entitled "appendix" created on Oct. 13, 2001, and being 940 kbytes in size.

BACKGROUND OF THE INVENTION

The invention addresses the problem of efficiently representing, storing, retrieving and processing real world knowledge on a computer or network of computers.

The problem is a fundamental one which has been made all the more apparent since the invention and growth of the internet. It is also one that has enormous ramifications in every area of human endeavor. Historians have argued that much of the scientific and cultural progress that the human race has made can be traced to innovations which positively affected the storage and spread of knowledge between peoples and generations. The internet has the potential to be another innovation in this list but is hindered by technological barriers which prevent the knowledge contained in its millions of linked computers being exploited to its full potential.

Typically, a computer system will store any knowledge it needs to keep in a local form understood only by the local system. The files recording this information will only be updated and read by the local software and the knowledge contained in them will only be usable by other computer systems after a great deal of programming work has been done to integrate the two systems. This problem applies even if the files are stored in a widely-recognized file format. For example, a database application may store an employee database in a recognized relational database format which can be read by other database systems. However, without specific programming, all the new system will see are rows and named columns containing numbers and strings. It will have no understanding, say, that the fields entitled "employee name" denote people and would certainly not be able to answer, for example, a query about monthly salary by dividing the number under "annual salary" by twelve.

Another limitation of a typical computer system is the narrow domain of the knowledge it can contain. The programming effort required even to handle very specific knowledge is huge so a typical computer system can only deal with the very narrow scope that the application is designed to cover. Once that effort has been made the program generally cannot be made use of elsewhere.

A common way to store general knowledge in some applications is to use natural language (e.g. English text) to store the information. This approach certainly allows the widest possible domain of knowledge to be stored but natural language is not a format that is understandable to computers in any realistic way. This means that although computers can store and display natural language to humans with ease they cannot fully exploit the real meaning of the text.

Nowhere are the limitations of natural language as a knowledge-storing mechanism more apparent than with the World Wide Web. The Web consists of billions of pages of text all of which are instantly retrievable and displayable by any computer on the internet. The amount of knowledge contained within these pages is phenomenal. However, if a human user wants to find something out using this knowledge the only practical technique that is available at the moment is keyword searching.

In order to find information using keyword searching the human user first hopes that a page exists which answers the question, hopes again that this page has been copied and indexed by a search engine and then tries to imagine what distinctive words will appear on this page. If any of the words guessed are wrong or the page has not been indexed by the search engine they will not find the page. If the combination of words requested is contained on too many other pages the page may be listed but the human user will then have to manually read through hundreds or thousands of similar pages before finding the knowledge they require.

In addition there is a certain arbitrariness about the words being used. Searching for general information on a person or product with a unique, distinctive name has a high probability of success but if the search is for someone with a common name or for information on something where the name also means something else (the Japanese board game "Go" is a very good example) the search will fail or an extraordinary amount of extra human effort is needed to locate the information. Furthermore, different ways of describing the same thing mean that several different queries often need to be made or the search may fail. For example, a search for information on "Bill Clinton", will not produce documents where he is referred to as "President Clinton" or "William Jefferson Clinton".

In summary, although innovations may be possible that can statistically improve the results produced by search engines none can completely avoid the fundamental problems with the indexing and keyword searching approach. To overcome these problems requires a strategy that includes representing knowledge in a form other than natural language.

Methods other than natural language of representing knowledge on a computer have been proposed previously. These include systems based on logic where a mathematical language with syntax and semantics is used to represent the knowledge; Semantic Nets where the information is modeled graphically using nodes which represent objects and links between the nodes which represent relationships between objects and frame-based systems where the knowledge is represented using frames which represent objects and slots which represent properties of those objects.

However, these methods have serious limitations and have failed to be widely adopted except in narrow applications.

SUMMARY OF THE INVENTION

The present invention enables a wide variety of knowledge to be stored and retrieved such as factual knowledge representing things that people do not know but may want to find out. The underlying knowledge storage mechanism in the preferred embodiment is also very efficient and does this with very little additional complexity. This lack of complexity has many advantages including processing time and the ability to develop and implement sophisticated methods based on this representation without having to deal with large numbers of exceptions and special cases. This advantage can easily make the difference between success and failure. The world around is very complicated so achieving this is difficult. It is far easier to add additional syntax and techniques to cover the exceptions than it is to find single methods that apply in a wide range of situations.

The models underlying the present invention are also designed to be close to human perception. The computers that incorporate various embodiments of the invention are usually there to provide knowledge to humans and the wider the gap between the invention's model and the human model, the more difficult this communication may be. The human brain and a digital computer work in fundamentally different ways so achieving this is by no means automatic.

According to various embodiments, a knowledge representation system implemented according to the present invention may be used on vast distributed systems such as, for example, the internet. Desirably, such embodiments are universal and simple enough to be widely adopted having the goal of enabling the world's computers to share and communicate real knowledge with each other. The layer of knowledge represented on top of any such distributed system is referred to herein as a Global Knowledge Base (GKB). This concept is analogous to the World Wide Web being a hypertext layer on top of the internet and the (now obsolete) Gopher system being thought of as a menu driven layer on top of the internet.

Various distributed embodiments also enable incentives to be given to publishers of knowledge. Incentives are not always necessary as there is often a public relations advantage to being a source of information but the invention enables additional incentives that may encourage businesses and individuals to become publishers of high quality information. These incentives include the incorporation of payment systems in return for providing knowledge and the ability to spread additional knowledge than that requested. This additional knowledge could include marketing information such as product details that the publisher has a commercial incentive to spread.

Much of the knowledge that we use is not stored statically but is adapted using reasoning from other facts. Answering the most basic questions often involves some implicit reasoning. For example, even for us to answer the question "What is your name?" we implicitly have to infer the answer from what our name was last time we thought about it and the fact we have not changed our name since. With other questions the inference required to answer is more involved. Although such reasoning is often done subconsciously by us, a computer system has to do this inference explicitly. Various embodiments including the preferred embodiment incorporate inference and reasoning in a highly integrated and efficient way enabling far more knowledge to be presented than that stored statically.

As human beings are often the ultimate consumers of knowledge an important feature of various embodiments of the invention is its ability to translate internal representations to and from natural language. One use of this feature is to enable human users to enter natural language questions and have those questions answered in natural language too. A further possible use is integration of other technologies. For example, an embodiment containing a voice recognition system could enable answers to spoken questions being generated and additionally a voice synthesis system could speak the responses.

A related feature present in some embodiments is for the reasoning process and source of the answers to be fully explained to the human operator. The knowledge produced by a knowledge representation system is often ultimately used by a human being and that human being generally has to take responsibility both for the accuracy of that knowledge and for any decisions which are based on it. For this reason, it is desirable that the system is able to justify and explain where the knowledge came from. By doing so, the human user can have more confidence in the information and justify those facts to others. A "black box" which simply prints out an answer without an explanation is of less use in many situations.

Another advantage of various embodiments is their ability to interface smoothly with existing technologies such as the World Wide Web. Methods are described of incorporating the invention within a web browser adding to its existing functionality. Other important technologies are existing database systems: it is possible to place a knowledge representation layer over existing database servers and to convert existing data into the present knowledge representation method. Other sources of knowledge including documents and web pages can also be referenced.

The invention also enables other strategies to be used in certain embodiments. These include the ability to display general information screens about any object based on its class and properties and to provide useful information even when a natural language question has not been answered successfully.

A further understanding of the nature and advantages of the present invention may be realized by reference to the remaining portions of the specification and the drawings.

DETAILED DESCRIPTION OF SPECIFIC EMBODIMENTS

1. General

Figure 1:
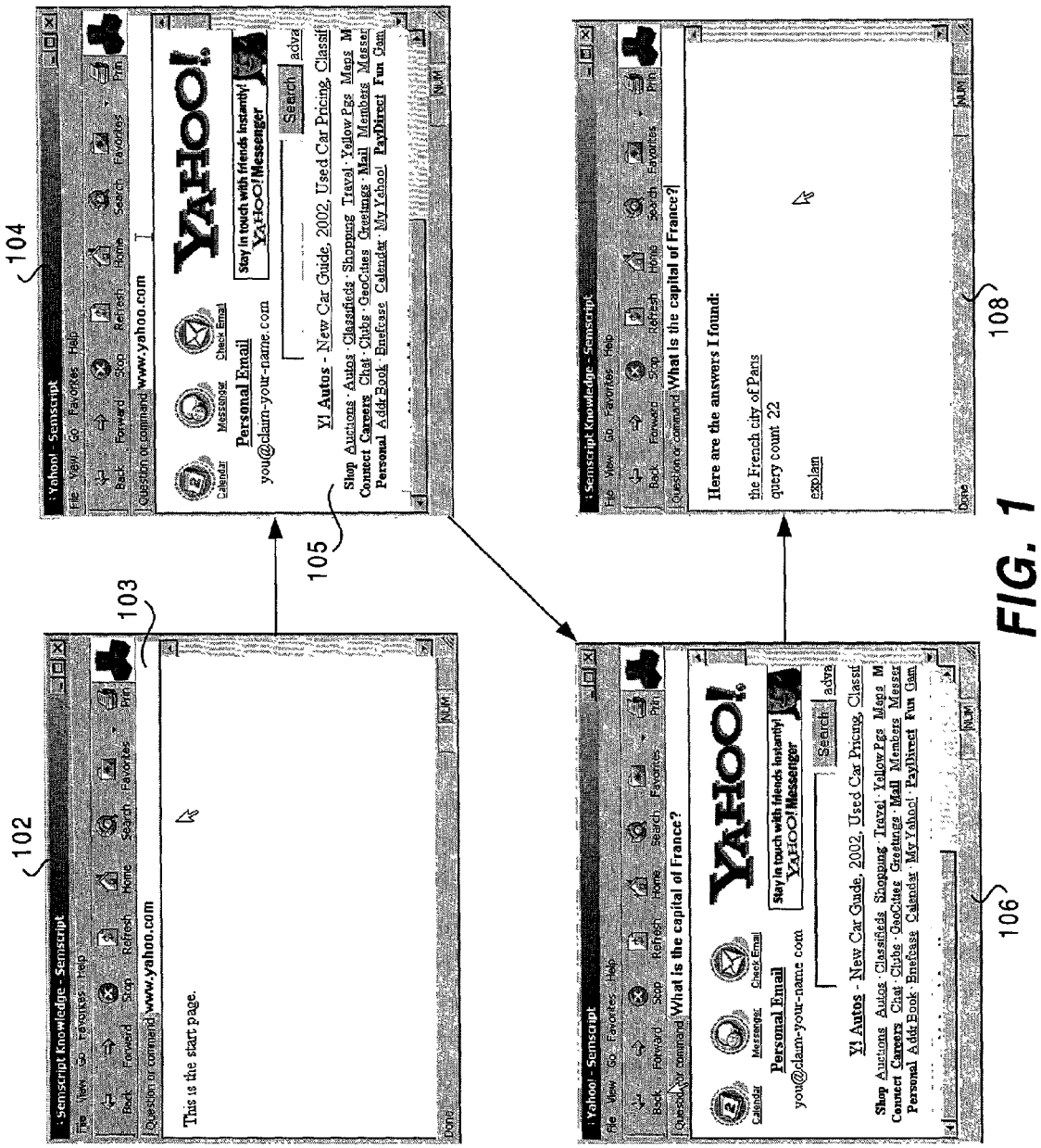
FIG. 1. shows a web browser incorporating the invention displaying web pages or answering a natural language question depending on what is typed into the URL line by the human operator.

This section describes in detail how the present invention works. It should be noted that many of the choices made in describing the preferred embodiment are fairly arbitrary including for example, the choice of ontology, the syntax and the names given to the classes and objects used as examples. Moreover, much of the description of the processing of the English language is trivially adaptable to other languages and thus the description should not be taken as limiting the choice of natural language to English. Many choices for implementing much of the technology are available and many different embodiments will be obvious to anyone skilled in the art who has read what follows. Any specifics described should not be interpreted as limiting the generality of what is claimed.

2. Basics

The invention is modeled on some of the basic principles of human perception. This is partly because human beings are the only intelligent entities that are known to exist and so are the only model and partly because even if there were other equally useful models it would make sense to use the human one as the computer systems using it often have to communicate with humans.

2.1 Objects

The fundamental thing that human beings do to the universe in order to make sense of it is to divide it up into objects. This process is fundamental to our thinking and reasoning is impossible without this basic conceptualization.

Having broken the universe up into objects we can then reason about our situation by various basic techniques. One of the most basic is to place that object into a class and draw on our past experiences with similar objects. For example, if we see an apple hanging from a tree, although we do not know anything about that specific apple, we have eaten other instances of apple before and know that each was good to eat. We can then use those experiences to make a decision to eat the one we see now. We are naturally capable of far more complicated acts of reasoning than this but core to all reasoning are objects.

Another thing to note is that non-physical objects are core to higher reasoning—it is virtually impossible to say or think anything without using this basic conceptualization.

Naturally objects are core to the invention too. In a natural language such as English nouns are one of the main building blocks of the language. In the present invention it is important to distinguish between an instance and a class, both of which are objects but of different types. This distinction is not immediately obvious when thinking about nouns. "Apple" for example is a class; "Albert Einstein" is an instance (of the class "Human Being"); "An apple" is English for an unspecified instance of the class "apple".

Basically in the invention plurals do not normally exist—objects are considered to be unique and singular. English phrases like "ten trees" correspond to a single instance of the class "group" where the constituents of that specific group object are ten unspecified instances of "tree".

In the invention all identified objects have a name. This name must be unique and in the preferred embodiment should correspond to a common yet fairly specific English noun or noun phrase for the same object. Instances are usually given the English proper name for the object if there is one. If the proper name is not unique then a noun phrase is used including the proper name. In the preferred embodiment these names can include spaces making them very close to normal English.

As a last resort, one can distinguish between objects that would otherwise have been assigned the same name, by adding an integer at the end (after a space). If the integer is missed off it is assumed to be 1 so new objects which clash with existing objects start their numbering with 2. For example:

[William Jefferson Clinton] is the object name for President Bill Clinton and is exactly the same as [William Jefferson Clinton 1]. Should there be another William Jefferson Clinton out there he might be assigned the name [William Jefferson Clinton 2]. Names are case insensitive. e.g. [William Jefferson Clinton] is the same object as [william jefferson clinton].

Note how the names are written in square brackets. This identifies the thing as a name and also means that such names are recognizable as being part of the present invention even when written out in some context where what it is would not otherwise be obvious.

A name within the disclosed knowledge representation system is effectively a universal identifier. Although "Bill Clinton", "William Jefferson Clinton", "President Clinton" etc. may all be versions of one person's name and may all denote him uniquely in natural language, there is only one name for him within the knowledge representation system.

The real world names that denote him including all the above examples, can be specified as denoting [William Jefferson Clinton] by the use of facts (described below).

These translation facts enable references to "Bill Clinton" etc. within natural language questions to be successfully understood.

Generally the above syntax is unrelated to the ontology used or the class of the object. One exception in the preferred embodiment is the class of strings (sequences of characters). Instances of this class are simply the string itself put in quotes. e.g. ["William"] is the name for the sequence of characters 'W' ... 'i' ... 'l' ... 'l' ... 'i' ... 'a' ... 'm'—it means nothing more than that. Such objects are useful for stating information useful for translation and for parametered objects (described below).

2.1.1 Parametered Objects

Some classes contain an infinite (or extremely large) number of objects that can be consistently understood in some way. For this reason we need to denote such objects by a combination of the class name and data as it is not practical (or indeed possible for infinitely large classes) to statically identify and manually name every instance of the class. The syntax of a parametered object in the preferred embodiment is:

[<class name>: [object 1]; [object 2]; ... ; [object n]]

Parametered objects have at least one object within the name as a parameter. The number of parameters can be fixed for a particular class e.g. Timepoint (a moment in time) or vary e.g. Group (a collection of objects regarded as a single object).

For some objects strings containing the important information are used as the parameter or parameters. This is especially useful where there is already a well-established "real-world" syntax for members of the class. A simple example is the class of integers. e.g. [Integer: ["8128"]]. Integers already have a universal syntax and meaning using the digits 0–9 in sequence and the decimal system. It is thus easy and obvious to denote them using a single string object as the parameter. A more complicated but equally valid example is a chess position where a standard way of denoting them as strings and including all the other information (such as the side to move and castling rights) has already been established. e.g. [chess position: ["R7/5p1p/5Kp1/8/k6P/p1r5/2P5/8 b - -"]]

Another common class of parametered objects used in the preferred embodiment is the timepoint class. Here a single string object is used with a format that is not widely used. It is a sequence of integers separated by "/" characters, denoting (in order), the year, the month, the day, the hour in 24-hour clock, the minute and the second. Any further integers are tenths, hundredths, thousandths of seconds etc. e.g.

[timepoint: ["1999/6/3/15/0"]] is 3 pm on the 3$^{rd}$ of June 1999 UTC. The accuracy of this timepoint is within one minute. [timepoint: ["1999"]] specifies a "moment" of time but the accuracy is one year.

Parametered objects are compared by comparing each parameter in turn. If the nature of the class means that order is unimportant (e.g. group) the parameters need to be considered in a pre-determined order (e.g. alphabetical) so that the same objects will be compared as equal.

Parametered objects can also have other parametered objects as parameters. This nested nature of parametered objects can be extended indefinitely deep. For example, we could define a class "pair" specifically for objects consisting of exactly two things, e.g. [pair: [integer: ["5"]; [integer: ["7"]] and having done so there is no reason why we could not create a name for the object consisting of the group of this object and other things, e.g. [group: [pair: [integer: ["5"]; [integer: ["7"]]]; [William Jefferson Clinton]] is the object which involves considering the pair (5,7) and Bill Clinton as a single thing.

Figure 12:
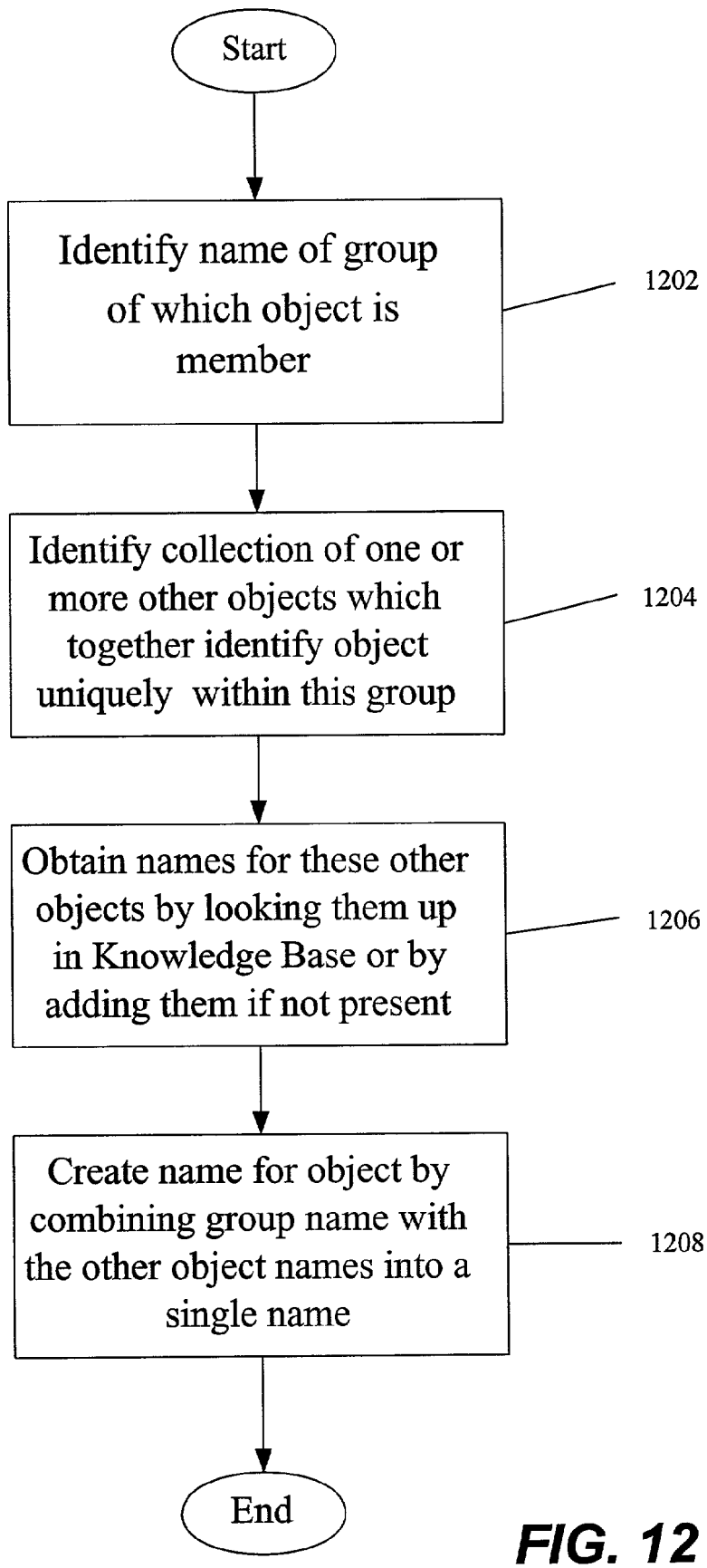
FIG. 12. illustrates the steps required to name a parametered object.

The process of creating a parametered object in illustrated in FIG. 12. The first step is to determine the group that is going to be used (step 1202). Next the objects which together uniquely identify our object within this group are identified (step 1204) and the internal names for these objects obtained (step 1206). Step 1206 may even involve using this same method to obtain names for one or more of these objects. Having obtained internal names for all the objects, the name of the object is created by combing the group name with the objects names to create a single identifier (step 1208). In the preferred embodiment this is in the form [<<class name>: [object 1]; [object 2]; ... ; [object n]] as described above.

2.2 Relations

The second core concept to the human perception of the universe is that of a relationship between objects. Relationships can exist between physical objects and also between physical objects and non-physical objects (concepts). e.g. "John is married to Sarah" is a natural language assertion about a relationship between two physical objects (in this case people). "The apple is green" asserts a relationship between the attribute "green" with the instance of apple being talked about. "The book is about Albert Einstein's career" asserts a relationship between a book and the concept of Albert Einstein's work history. "The soup tastes salty" asserts a relationship between the attribute "salty" with the soup. All of these natural language assertions also contain information about time (tense): this will be dealt with below.

As relationships are core to human perception they are also core to the present invention. Relationships are also objects. For example:

[is married to] is the object (relation) that corresponds to the Western concept of marriage between a man and woman. i.e. a formalized monogamous marriage.

[is an instance of] relates an instance object to a class object. e.g. the relationship between Albert Einstein and the class Human Being

[applies to] relates an attribute object to another object. i.e. It says that a certain property applies to something. This second object can be anything: an instance, a class, a relation or even another attribute.

[is a subclass of] relates one class to another and says that the first class is more specific class than the second and that all objects that are members of the first class are also members of the second. For example, this relationship applies between the class [apple] and the class [fruit]. This relation defines a tree of classes and objects are members of all the classes going up the tree with the root class being the class of all objects.

Relations are typically named by finding a present tense verb phrase that uaambiguously describes the relationship.

2.3 Facts

Core to the preferred embodiment of the disclosed knowledge representation technology is the four object fact. The basic syntax is:

[name of fact]: [object 1] [object 2] [object 3]

i.e. Four objects listed in order on one line, with a colon after the first one. A great deal can be achieved without the [name of fact] object and an alternative embodiment could omit this extra identifier completely or make it optional. However, in the preferred embodiment it is compulsory.

Object 1 and Object 3 can be of any type. Object 2 has to be a relation. This fact itself is an object with the name [name of fact]. When asserting knowledge all four objects have to be names.

In the preferred embodiment, the names of facts are of the form

[fact.<unique string>@network.machine.name]

The network machine name (e.g. an internet host name) "owns" the fact and is responsible for its truthfulness and maintaining it. Other machines will refer to this machine to get information about this fact if necessary. An alternative embodiment would be to associate the machine with the fact but to include the name of the machine separately from the fact name.

Here are some simple examples of facts:
[fact.1@semscript.com]: [William Jefferson Clinton] [is married to] [Hillary Rodham Clinton]
[fact.2@semscript.com]: [William Jefferson Clinton] [is an instance of] [human being]
[fact.3@semscript.com]: [Paris] [is the capital of] [France]

Note how facts are essentially strings of text and are thus easily stored on a computer and communicated over a network between computers.

The other advantage of the fact concept is its lack of complexity. A sequence of four objects with an extremely straight-forward syntax can be regarded as a permanent atom of knowledge. An unordered collection of such atoms can communicate and permanently store real knowledge without any of the problems of natural language. Yet another advantage of the representation is that facts such as the above can easily be stored in a standard relational database consisting of four columns with each field being text. Use of indexes means that combinations of known and unknown objects can rapidly be looked up. A further advantage is that as each atom of knowledge has a name, it is very easy to represent facts about facts. This is typically how time is represented (see below) but could also include knowledge about when the fact was added to the knowledge base, what person or entity added it or any of a large number of other possible assertions. The naming also gives a source that "owns" the fact enabling all sorts of possibilities relating to maintaining and verifying the fact over a network.

Any knowledge representation method that uses more complicated syntax for representing knowledge will fail to have these advantages.

Note also that by placing the relation object in the middle of the two other objects, the facts "read" like natural language making it very easy to understand by humans.

Knowledge stored in this manner can also be used to supplement knowledge stored using other strategies.

2.4 Time

The final core concept to the human perception of the universe is that of time. Time is so core to our understanding of the universe that it is almost impossible to state anything in natural language in a time neutral way. Every verb has a tense associated with it.

In natural language things are expressed relative to the present. This makes perfect sense for natural language as it evolved in the spoken form and thus every communication is both transient and communicated at a known moment of time. The present is thus the most convenient anchor to which to relate time information.

However, when natural language is in written form the reader needs to adjust what is being said with his or her knowledge of when the text in question was written. For example, when reading an old newspaper, facts expressed in the present tense actually relate to the date the newspaper published and may well be expressed in the past tense if communicated at the date of reading. The reader therefore has to adjust his or her understanding of what is being read with the knowledge that it was written in the past.

As the main purpose of the present invention is to allow long-term storage of knowledge and processing by a computer, it makes sense for time to be expressed in the preferred embodiment in absolute terms. i.e. we assert things are true for periods or moments of time expressed as a date/time-of-day and not relative to the moment when they are expressed. Alternative methods are possible but doing this avoids the complexity of having to adjust the meaning of facts from moment to moment as time goes by.

A simple fact has no information about time in it. For example:

[fact.4@semscript.com]: [London] [is the capital of] [England]

simply asserts that the relationship [is the capital of] was/is/will be true for at least one moment in the time line. It may be true for all of it, it may have been true only for an instant in 1658.

To get around this problem each fact expressing a relationship that can change must be accompanied by one or more temporal partners. Temporal partners are facts that reference other facts and make assertions about when another fact is valid.

e.g.
[fact.1@semscript.com]: [William Jefferson Clinton] [is married to] [Hillary Rodham Clinton]
[fact.2@semscript.com]: [fact.1@semscript.com] [applies for timeperiod] [timeperiod: [timepoint: "1975"]; [iafter]]
[fact.2@semscript.com] makes an assertion about [fact.1@semscript.com] namely that they are/have been married continuously since 1975 until the indefinite future. Note this pair of facts says nothing about whether or not they were married before 1975.

Many facts are true for all time and it is often possible to infer this from attributes of the relation in the fact. e.g. the relation [is true at timepoint] is a permanent relationship: Although our knowledge of history may change or be updated as time progresses, the past is immutable. This practice of making an assertion without temporal partners is usually reserved for facts that absolutely cannot change from moment to moment—if they were true once they are always true. Generators (see below) can then infer the temporal partners (if needed) asserting they are true for the whole time line.

The other way of dealing with time is for the knowledge base to only store information about the present (and not store information about things that were true in the past and not true now) and to update the knowledge base when things change, replacing the facts that are no longer true. Such a fact simply asserts something about the moment in time when the access of the knowledge base was made and it is not necessarily true at any other time. In other words the ability to assert knowledge about the past is sacrificed in exchange for benefits of convenience and efficiency.

In the preferred embodiment, this method is used for facts used for translating to and from natural language. The reason being partly that their use is in translating questions and statements that happen in the present and thus old versions of these facts are not very useful, partly because they would almost never be used and partly because they change very infrequently. Temporal partners could be included but it would needlessly complicate the translation process.

Another common situation where this method is (has to be) used is when querying the system for the current time. Naturally, a temporal partner for such a fact would be pointless.

One should note that some facts need to be updated and changed from time to time anyway. For example a temporal partner using the object [timeperiod: [timepoint: ["1987"]]; [iafter]] asserts the time period from 1987 until the indefinite future. At some point after the fact was added to the knowledge base, the fact may cease to be true. At this point the timeperiod object needs to be replaced with one incorporating the end date. The same applies when facts in the knowledge base are found to be wrong and need to be corrected.

The [timeperiod] class is a class of parametered objects where the two descriptive objects are the point in time when the period of time commenced and the point in time when it finished. However, to cover infinite or indefinite periods of time there are three special time point objects in the preferred embodiment. The first is [iafter] which indicates an unknown point in the future. It is used for things that are true in the present but which are not guaranteed to be always true. The second and third are [time zero] and [forever] which indicate respectively a point in time infinitely long ago and a point in time in the infinite future. They are used to indicate infinite periods of time, for example the object [timeperiod: [time zero]; [forever]] indicates the entire time line and would be used for example in a temporal partner for facts that are true by definition.

2.5 Negative Facts

It is also possible to assert that a relationship is not true. In the preferred embodiment this is done by putting the tilde ("~") character before the relation object. e.g.

[fact.3@semscript.com]: [London]~[is the capital of] [England]

[fact.4@semscript.com]: [fact.3@semscript.com] [applies for timeperiod] [timeperiod: [time zero]; [timepoint: "1066"]]

These two facts together assert that London was not the capital of England before some point in 1066.

When storing facts in a relational database whether the fact is positive or negative can be indicated by having a Boolean field in addition to the four string fields containing the names of the objects.

2.6 The Golden Rule

The golden rule is that a relationship cannot both exist and not exist between the same pair of objects at the same moment in time. Contradictions or inconsistencies in knowledge represented by facts are produced by finding or logically generating breaches of this rule.

Note that the representation of a timepoint is imprecise no matter how accurately it is specified. In order to create a contradiction we have to show a relationship between the same pair of objects both existed and did not exist for two overlapping periods of time implied by the accuracy of the timepoint. For example the British Queen Victoria was both alive and dead (not alive) in 1901: she was alive in the part of 1901 before her death and dead in the rest of it. If someone remarries an hour after their divorce goes through they are married to two different people on the same day but without being married bigamously. If, however, you can show that someone was alive for one timeperiod and dead for another and show that the two time periods overlap only then have you found a contradiction.

2.7 Summary

In the preferred embodiment of the invention the universe is modeled as a huge array of objects and relationships between pairs of objects. As the time clock ticks named relationships between pairs of objects spring in and out of existence.

Figure 10:
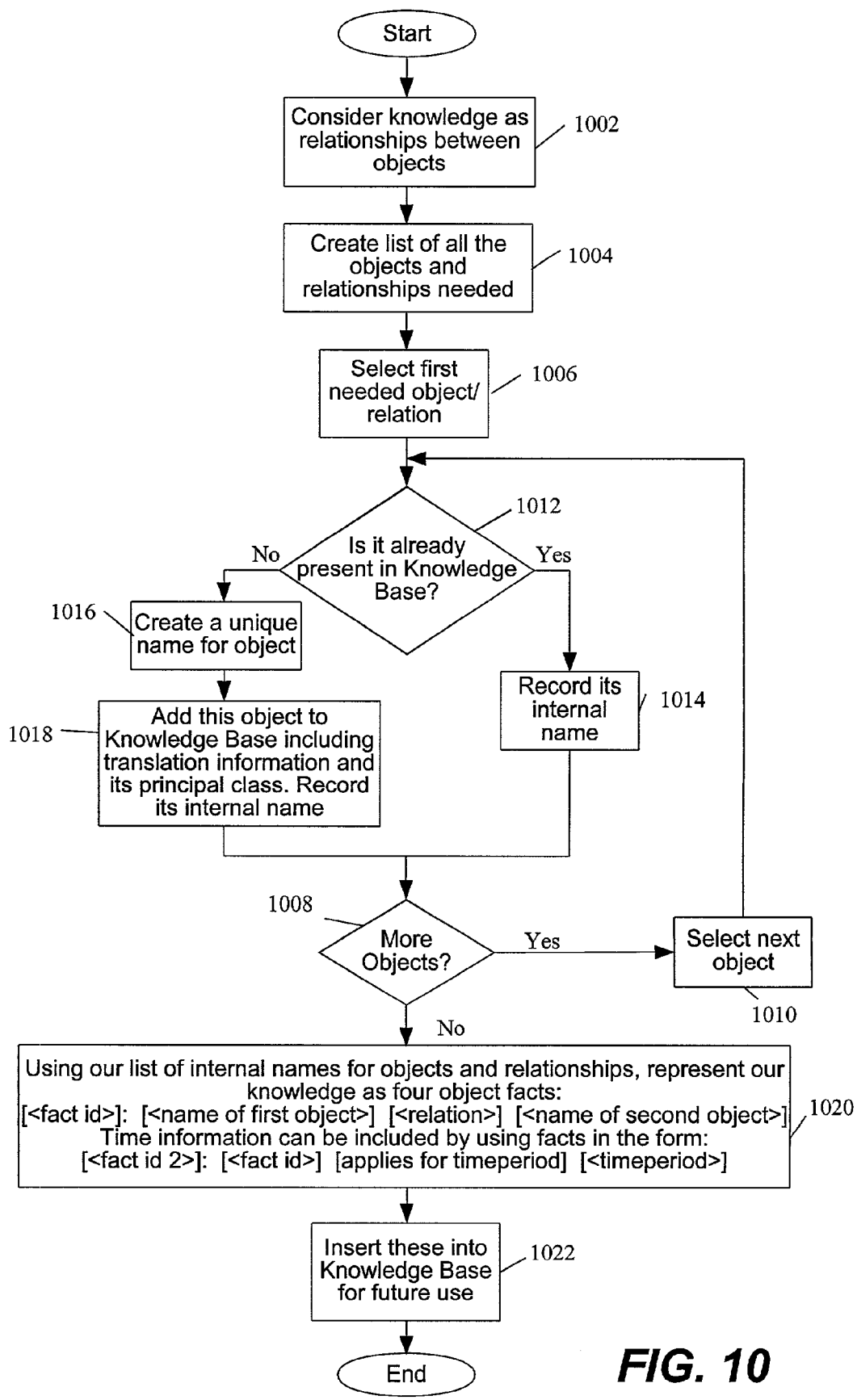
FIG. 10. illustrates the process of placing knowledge in a knowledge base powered by the invention.

The process of representing knowledge with facts is illustrated in FIG. 10. Step 1002 is to think of the knowledge as relationships between objects and time periods that these relationships hold. The next step is to identify all the required objects and relationships (step 1004). Steps 1006, 1008 and 1010 then implement a loop where each of these objects and relationships are considered in turn. The first thing is to see whether each object is already identified in the knowledge base (step 1012). If it is a record is made of its object name (step 1014). If not a name is created for this object (step 1016) and information is added to the knowledge base to record its presence and basic properties (step 1018).

Once this process has been done for all the objects and relationships the next step is to represent our knowledge using four object facts (step 1020) and to insert these facts into the knowledge base (1022).

All possible objects "exist" in the knowledge base for all time. Existence of physical objects (and other objects such as legal entities which only have life for a given period of time) is expressed by the presence of a relationship with an attribute for the time they are around in the real world. e.g.

[fact.1356@semscript.com]: [alive] [applies to] [queen victoria]

[fact.1357@semscript.com]: [fact.1356@semscript.com] [applies for timeperiod] [timeperiod: [timepoint: ["1810"]]; [timepoint: ["1901"]]]

[fact.1358@semscript.com]: [alive] [applies to] [queen victoria]

[fact.1359@semscript.com]: [fact.1358@semscript.com] [applies for timeperiod] [timeperiod: [timepoint: ["1901"]]; [forever]]

It should be noted that relationships can exist between physical objects even when one is not present in the physical world any more. e.g. a modern day book can be about Isaac Newton even though he died hundreds of years ago. The book and the person are both physical objects with a relationship between them existing in the present yet there is no shared moment in time when they both existed.

2.9 Queries

Queries are the internal representation of a question. Queries look very much like a series of facts but the purpose is to see whether they can be justified from knowledge found in or inferred from the knowledge base rather than to assert information. Variables can also replace objects in the facts (including objects within parametered objects). For example:

query f: [William Jefferson Clinton] [is married to] [hillary Clinton]

f [applies at timepoint] [timepoint: ["1999/6/3"]]

asks the question "Was Bill Clinton married to Hillary Clinton on the $3^{rd}$ of June 1999?"

Notice how the name of the first fact is given a variable f rather than a name. In processing the query the engine will solve for f with every possible fact name that asserts that relationship between Bill and Hillary Clinton and then try to satisfy the second line using it. Provided both lines can be satisfied with at least one value of f the query will answer "Yes"

In queries the name of a fact can be dropped when the name is unimportant i.e. when it is not needed for a later part of the query and when it is not wanted by the user. This is effectively the same as expressing the fact name as a variable and then not referencing the variable again. Such lines thus have only three objects listed.

Variables can also be used in place of other objects in the facts. For example:

query a
f: a [is married to] [hillary Clinton]
f [applies at timepoint] [timepoint: ["1999/6/3"]]
asks the question "Who was married to Hillary Clinton on the 3$^{rd}$ of June 1999?"

If the query is requesting objects as the answer, one or more variables that represent the desired objects follow the "query" statement. If the query is just trying to determine the truth of the query we term it a truth query and it has no variables after the "query" statement. Queries whose purpose is to produce one or more named objects as answers are termed object queries. The above query with the a missing from the query statement would ask the question "Was anyone married to Hillary Clinton on the 3$^{rd}$ of June 1999?"

Figure 13:
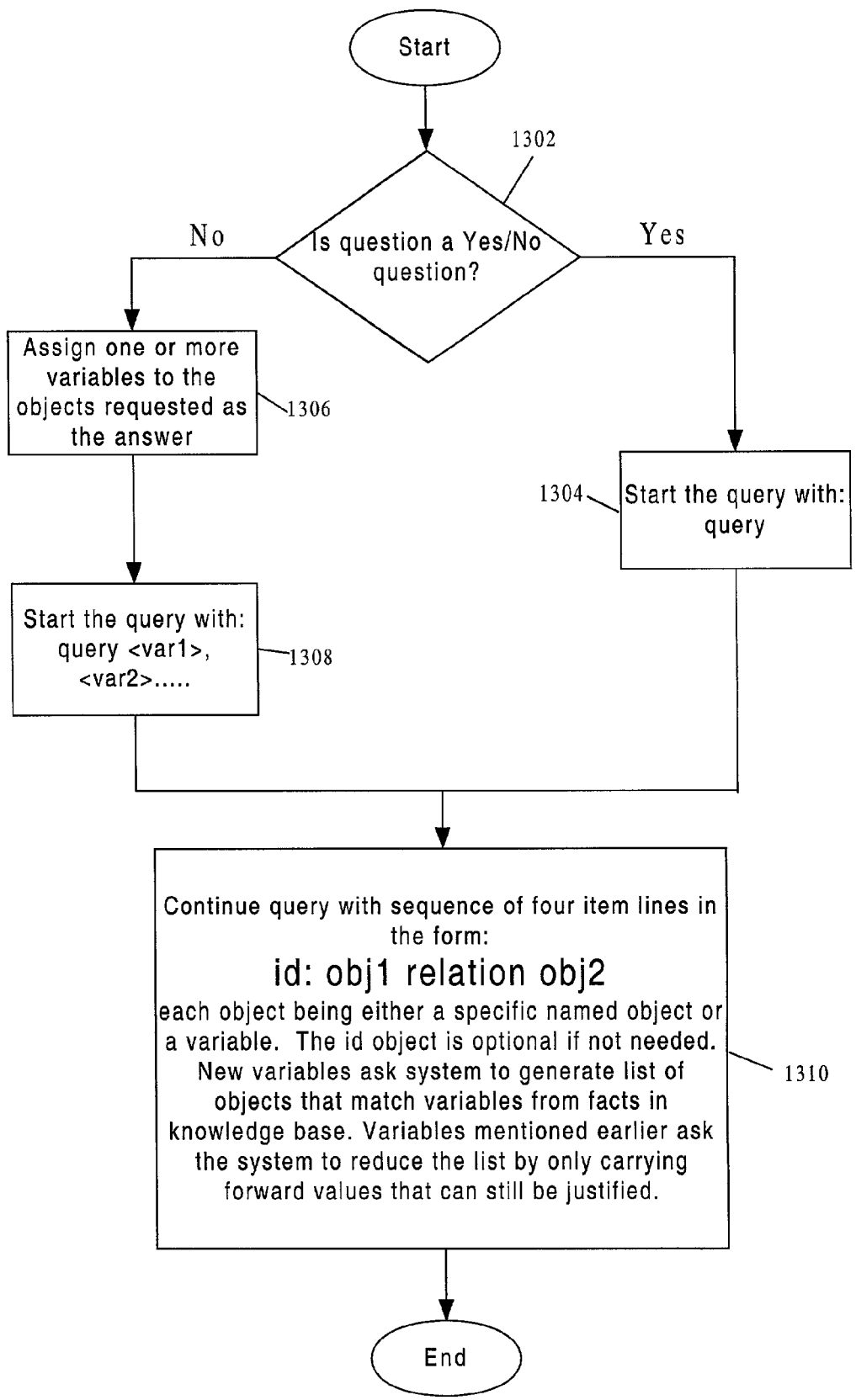
FIG. 13. illustrates the process of creating a query.

The process of creating a query is illustrated in FIG. 13. Step 1302 is a test to see whether the question being asked is expecting a yes or no as the answer or something else (represented as objects). If it is a yes/no question step 1304 is done. This step starts the query with a "query" statement and no variables. If one or more objects are expected as the answer, step 1306 is done where variables are given to the various objects of which the answer is composed and then the query starts with the text "query" and a list of these variables separated by commas (step 1308).

The next step is to create the body of the query (step 1310). This involves creating a series of lines using variables and named objects which the knowledge representation has to satisfy to answer the query. These lines can look like four object facts or can omit the fact name if it is not needed. If the query statement contains variables these variables must be used within the lines.

A more complicated query is the following:
query a
a [is an instance of] [nation state]
t: a [is geographically located within] [the continent of Europe]
t [applies at timepoint] [timepoint: ["1999"]]
t1: f [is the capital of] t
t1 [applies at timepoint] [timepoint: ["1999"]]
f [commonly translates as] d
c [is the first letter of] d
c [equals] ["p"]
which translates as "Which continental European countries have capital cities whose names start with a 'p' in 1999?"

The first line will generate a list of several hundred possible values for a (current and former countries) which will be whittled down by the tests in the next few lines for location within Europe. The capital cities are looked up, translated into strings which are their usual English names and the first letter is checked to be a "p". Any values of a remaining after the last line is checked are returned by the query.

Essentially lines in the query can be regarded as filters if they reference variables that have been mentioned in earlier lines. Such lines reduce the possible values for that variable by doing tests on it, substituting in all previously found values one by one and seeing if the resulting fact can be found (directly or after inference) in the knowledge base. If the line uses a variable for the first time it can be regarded as a generator—finding all possible values for the variable that are passed downwards. If any values (or combinations of values) survive the generators and filters to the end of the query they result in a "Yes" answer for a truth query and a list of objects for object queries.

This query processing is implemented in the preferred embodiment by searching the knowledge base for solutions to the first line of the query giving a list of possible substitutions for the variables and then creating new queries composed of all subsequent lines of the query (if there are any) with references to the first-line variables replaced for the solved objects. These new queries are then recursively solved and any results combined with the results from the first line.

The recursive calls are guaranteed to terminate because each depth of recursion corresponds to a query that is one line shorter than before and the initial query had a finite number of lines. If any call cannot produce any facts to satisfy the first line of its query then it returns with no result and does no further recursive calls. If the first line contains no variables (either because it never did or because earlier recursive calls have substituted the variables for objects), the routine just checks to see if any facts are in the knowledge base that match the current line and either continues with the next line or simply recurses again on the query made up of all subsequent lines (both methods are equivalent).

The recursive calls pass back down the variable substitutions they have discovered which survive future recursive calls. If there are no future recursive calls then the substitutions that are passed back are simply the ones that are generated by processing the last line of the original query.

The alternative non-recursive method using a stack instead of recursive calls will be obvious to anyone skilled in the art of computer programming.

Queries can be run in a number of modes. Establish mode simply checks whether values can be found in the knowledge base that confirm the facts: "No" and "unknown" are thus the same result for truth queries.

Full mode attempts to distinguish between No and Unknown for truth queries by seeing whether it can establish a breach of the golden rule for any part of the query using facts in the knowledge base by assuming the lines in the query are true. This test is done if it fails to answer the query with its first attempt. If it can establish a contradiction the answer to the query is "No" as we can assume that the golden rule is true. If not, the answer is "unknown".

This is done in the above query answering algorithm by adding a test after the first line of a query has failed to produce an answer. The test is designed to see whether the failure may simply be due to the knowledge base not containing the answer (an "I do not know" answer to the yes-no question) or because it is wrong and contradicted by other knowledge in the knowledge base (a "no" answer to the yes-no question).

The test involves searching for a temporal partner for the first line if one exists and then creating a reverse query composed of the first line with the relation made negative if it is positive and positive if it is negative and the temporal partner replaced with one which would create a breach of the golden rule if applied to this reversed fact and if both sets were true. i.e. the [applies at timepoint] relation is replaced by [applies for all of timepoint] relation and the [applies for timeperiod] relation is replaced by [applies for some of timeperiod] and vice versa. e.g. Although it might be possible for both the facts "John is married to Sarah in 1999" and "John is not married to Sarah in 1999" to be true (if they divorced in that same year) it would not be possible for both to be true if the second statement was instead "John is not married to Sarah for all of 1999" and in this case one statement being true implies that the other is false.

In the case where there is no temporal partner (implying either a permanently true relation or one that is true at the present) the reverse query is simply the fact with a positive relation made negative or a negative relation made positive.

By running this reverse query and getting a "yes" answer the routine can answer the original query with a "no".

The issue of completeness of the results for object queries (i.e. have all objects been returned?) is also dealt with below (it is also tested for in full mode). To do this requires information in the knowledge base about the number of objects that have a particular relationship which can then be matched with the number of objects actually found.

The preferred embodiment also contains certain parameters that can be added to lines in a query for efficiency reasons. These include:

/S
means that the current line should only be processed using static knowledge. There is no need to use inference to find this out. A typical situation for this is to see whether a common attribute applies. If the attribute is a fundamental property that can be assumed to be always stored statically if it applies, then there is no point in doing anything more complicated to find it. e.g. a line in a query might be:

[symmetric] [applies to] r/s
where r is a relation.

If a relation is used, its core properties are always stored so we can assume that [symmetric] either applies or not from a static search and do not need to waste time trying to use inference to see if it holds.

/1
means that only one answer need be found for this line (i.e. one substitution for the variables). Two possibilities for using this are either that the semantics of what is being asked implies there is only one answer or because only one answer is needed. This increases the efficiency of the engine as the search can stop after the first object is found.

2.9 Generators

Far more facts exist than can be stored statically. For this reason inference is an important feature of the preferred embodiment.

Reasoning in the present invention is done with dumb and smart generators. Generators are just that: things that generate facts from other facts or combinations of facts. In the preferred embodiment generators are specified in three parts: a title line identifying it as a generator and listing variables; a header query that must be run to see if the generator applies (and possibly to generate values—the list of variables after the generator line) and a footer which is a number of facts which can potentially be generated by the generator. In the preferred embodiment lines starting with "!" are used for comments and are ignored by the engine.

2.9.1 Dumb Generators

A simple example of a dumb generator is the following:
generator a %,b %,tp
f: a % [is married to] b %
f [applies for timeperiod] tp
=>
t: b % [is married to] a % *
t [applies for timeperiod] tp This asserts that if person a is married to person b for a given time period then person b is also married to person a for that same time period. This might be obvious for marriage but it would not be true for example with the relation [is a parent of].

This example is illustrative. In the preferred embodiment the above example is done by looking for the attribute [symmetric] to the relation and having a slightly more complicated generator that only switches the two objects around if the attribute applies. This saves having to have a similar generator for every relation with this property.

Dumb generators express inferences about how, for example, the existence of a relationship implies the existence of other relationships or how the existence of an attribute care be used to infer other facts.

For efficiency reasons it is clearly not practical to run every generator that exists at every opportunity so when answering a line of a query, the query answering system first checks information stored statically and then goes on to look at generators later by matching the line of the query it is currently on with lines in the footer of the generator (i.e. it works backwards). Only the lines marked with an asterisk can be matched. If the line matches, the top of the generator is run as a query (perhaps with values substituted for variables) to see whether the bottom lines can be considered as facts. If they are, the footer facts are generated and the generated facts are added to a cache. Any objects that match variables are included in the answering of the query.

In the preferred embodiment, the character that ends a variable name indicates rules on what can be matched with them. Sometimes when comparing the current line of a query with the asterisked footer line, a variable will match a variable, sometimes a named object will match a variable and sometimes a variable will match a named object. Such matches can happen within parametered objects as well as at the top level.

The percent sign after the variables in the matched line says that the variable can be either left as a variable (i.e. matched with a variable in the query line and filled by the query in the top half of he generator) or textually substituted for a name. If substituted the variable is removed from the query statement at the top and the object name is substituted into the header query wherever the footer variable appears.

e.g. If matching [Hillary Clinton] [is married to] [William Jefferson Clinton] the above generator would be run and the top half would be a query getting all the timeperiods on file for when they were married. Facts would then be generated asserting that they married the other way around for the same time periods.

A dollar sign following the variable says that the variable must be replaced and textually substituted for a real object name from the query line being looked at—matching with other variables is not permitted and the generator will not be used if that is the kind of match found. If the variable has no percent or dollar sign it must correspond to a variable in the query line. By 'must' we mean that we cannot use the generator if the correct match is not present.

The unique fact names for the results of a generator are created automatically by the inference engine and are assigned to variables if they are needed for temporal partners (like with the above example). Facts generated by generators are also inserted into a temporary cache by the engine so they can be quickly found for use in subsequent processing of the query. This cache is checked by the engine even before searching statically-stored local facts. The cache enables facts generated in earlier parts of the query to be accessed without running the generator a second time with the same objects. By keeping a record of what generators with what parameters generated items in the cache the engine can avoid doing the same operation twice simply by using the cache items.

2.9.2 Smart Generators

Smart generators are like dumb generators but where the footer cannot be generated simply by rewriting the results of a query: Some computer code needs to be executed (run directly or interpreted) to produce the results. For example a very commonly executed smart generator is the following:

```
generator tr
a$ [applies for timeperiod] tr
=>timeperiod_to_timepoint@local
a$ [applies at timepoint] tp$ *
``` which says that a relationship is true at a timepoint if the timepoint lies within a timeperiod when the relationship is true. This generator is vital as it simply is not practical to list, say, every instant in the last twenty years that Bill and Hillary Clinton were married as there are an infinite number of instants in any time period. We instead statically store a period of time and if a query asks whether they are married at a given instant the above smart generator is put into action. First all the timeperiods are gathered using the query at the top and the results passed to the timeperiod_to_timepoint tool (essentially an executable function) with the timepoint and timeperiod in question passed as parameters. If the tool determines that the time point lies within the timeperiod it generates the footer with an appropriate name for the newly-generated fact otherwise it does not. Note that it is not possible to do this using a dumb generator as calculation is needed to determine whether one point in time lies within a named time period.

Note also that the dollar character at the end of the tp$ variable implies that it must be matched with a named object—a named timepoint. There are an infinite number of timepoints in any timeperiod so it is only possible to check a given timepoint, not to generate all the possible answers.

Another commonly-used smart generator is the following:

```
generator
=>now@local
[current time] [applies to] n*
``` which works out which time point is the current time. This smart generator does not need a query at the top (the query is null and can be thought of as always returning "yes"). The reason is that we can always be sure that there is a timepoint which is the current time. The generator just generates the footer with the system date and time as the time point whenever it is called. Naturally the current time cannot be looked up statically.

Far more sophisticated smart generators can be written and we can potentially incorporate all the algorithmic achievements of the planet into the GKB for use in a very wide variety of contexts.

The computer code ("tool") that provides the intelligence to the smart generator is named in the preferred embodiment by name@machine.on.internet The machine.on.internet is a named machine which owns the tool and where the code can possibly be executed remotely. "local" means the code can be found on the local machine and/or is part of the local knowledge processing engine.

A wide variety of ways of implementing the tools and execution of the tools should be obvious to anyone skilled in the art. These include hard-coding of some of the more common tools within the engine; remote execution of code through network protocols (passing the parameters over the network and receiving the results); text scripting languages that can be downloaded from a remote machine and executed locally; other kinds of downloadable languages including those that are then executed directly on the local machine etc. As all these techniques have potential value, the preferred embodiment is to implement a mixture of techniques with information about the technique used looked up from the tool name. The implementation listed as an appendix contains only hard-coded examples.

Figure 14:
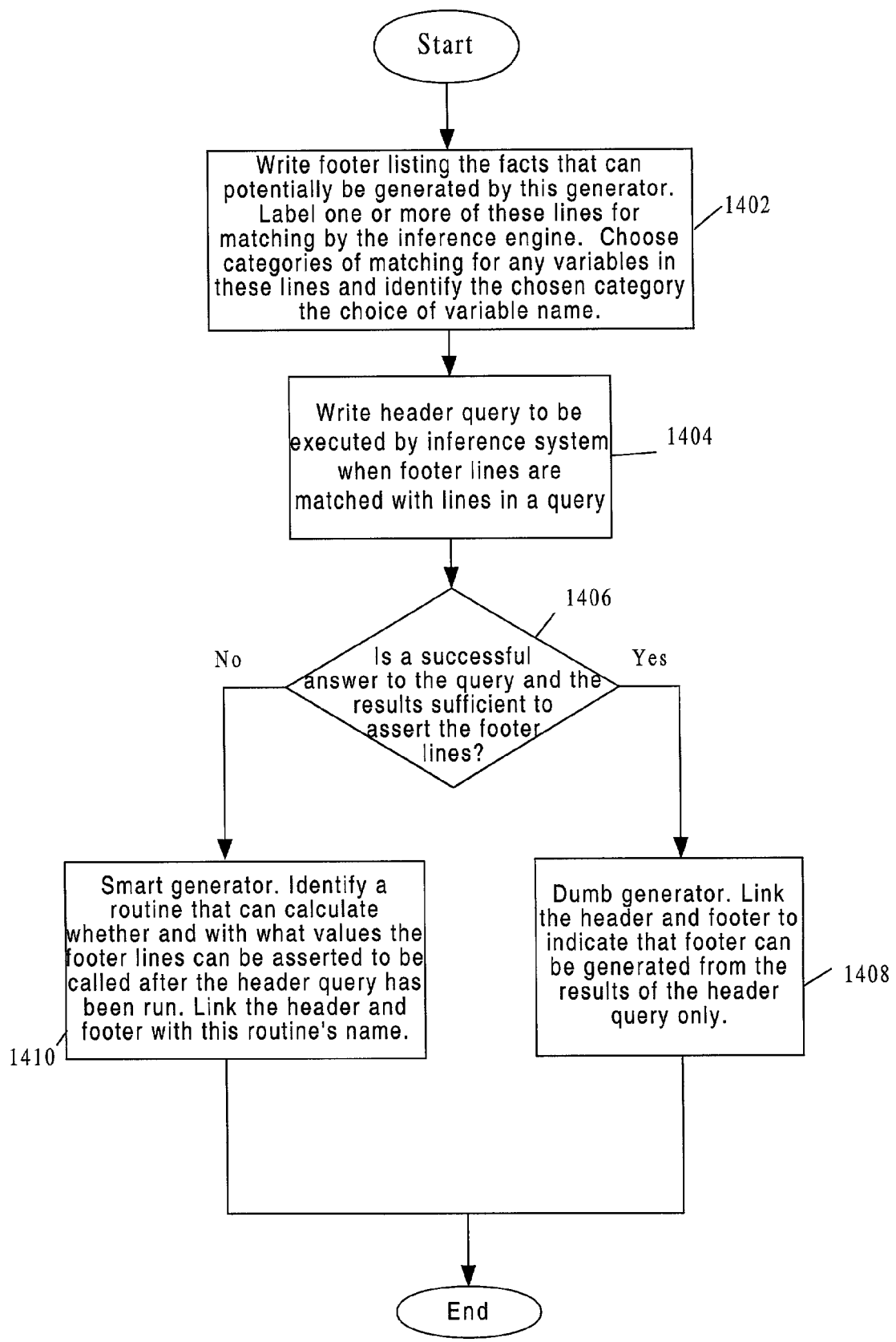
FIG. 14. illustrates the process of creating a dumb or smart generator.

The process of creating a generator is illustrated in FIG. 14. Step 1402 is the act of writing the footer lines which are the possible knowledge that our generator can assert. Lines are labeled and categories of matching of variables are also chosen at this step as described above. Step 1404 is where the header query is written as a first step to assert the knowledge. A branch (step 1406) is then done by testing whether the results of the query are sufficient to assert the knowledge or not. If they are then step 1408 is done making the generator a dumb generator: the header and footer and just linked. If not, step 1410 is done: this step involves providing a tool that can be executed to do additional checks before asserting the knowledge and including a link to that tool within the description of the generator. If step 1410 is done then the generator is a smart generator.

3. Translation

Translation is the art of transforming knowledge encoded within the present invention into natural language and vice versa. As natural language is the knowledge representation method that humans use and as human beings are those to whom the benefits of the invention are aimed, this process is desirable within various embodiments.

3.1 Translation from Natural Language

Translation of natural language questions into queries is readily achieved by the use of templates. This technique translates questions into queries resolving some ambiguity and type issues at the same time.

As used herein, the term "question" refers to any sequence of words in natural language the purpose of which is to solicit knowledge from the system. It need not necessarily conform to the classic grammatical definition of a question. For example, it could be in imperative form such as "Tell me what the capital of France is" or the meaning could be implied: For example, in some embodiments entering just "William Jefferson Clinton" could be an abbreviation for "Show me a general information summary about William Jefferson Clinton". (Generation of general information screens are discussed below.)

A translation template contains a sequence of known and unknown strings; a header query which generates results for the translation and does other consistency checks on the strings and a footer which is a query and the translation of the natural language text.

For example:

```
"What is" a b
- -
query c,d
a [function] c
b [ns] d
- -
query e
[current time] [applies to] now
f: e c d
f [applies at timepoint] now
```

The top line is the template. Any sequence of three recognized strings where the first is "What is" will be matched with this line and the query at the top run to see if it produces results.

The templates are indexed by facts in the form [<string>] [is part of the translation] [<template name>]

When analyzing the string, we thus only need to look at a small number of templates which may match—we do not need to scan them all.

e.g. If "What is the capital of France?" is asked as a question the engine will first attempt to break this up into a sequence of recognized strings (implemented using the breakup_word( ) routine in the source code listing in the enclosed appendix) one of which will be:

"What is" "the capital of" "France"

"the capital of" will then be textually substituted into the header query for a and "France" will then be textually substituted into the query for b.

The top query will then read:

query c,d

["the capital of"] [function] c

["France"] [ns] d which when run will return the results c=[is the capital city of] and d=[the nation state France]

[function] is a translation relation that describes how English phrases can express a relation in a function sort of way. For example "the spouse of", "the mother of", "a child of" etc. [ns] is the translation relation that relates singular nouns (or noun phrases) to an object name within the knowledge representation system.

The query is then run and the results will then be substituted into the bottom query as the correct translation of the question. i.e.

query e

[current time] [applies to] now f: e [is the capital city of] [the nation state France]

f [applies at timepoint] now

This query is the correct (and only) translation of the natural language question.

This query is then executed as follows:

The first line will result in a smart generator call to a tool which will give a single value to the variable now.

The second line will be found in the static database with e given the value [the French city of Paris] and f given its fact name.

The final line will finally be verified by using the smart generator which infers the truth of [applies at timepoint] statements from [applies for timeperiod] statement found in the static database. The final line will be verified as true if the current time lies within it (or at least one of them if more than one timeperiod is found).

The engine will then answer the natural language question with the answer "The French city of Paris"!

Figure 15:
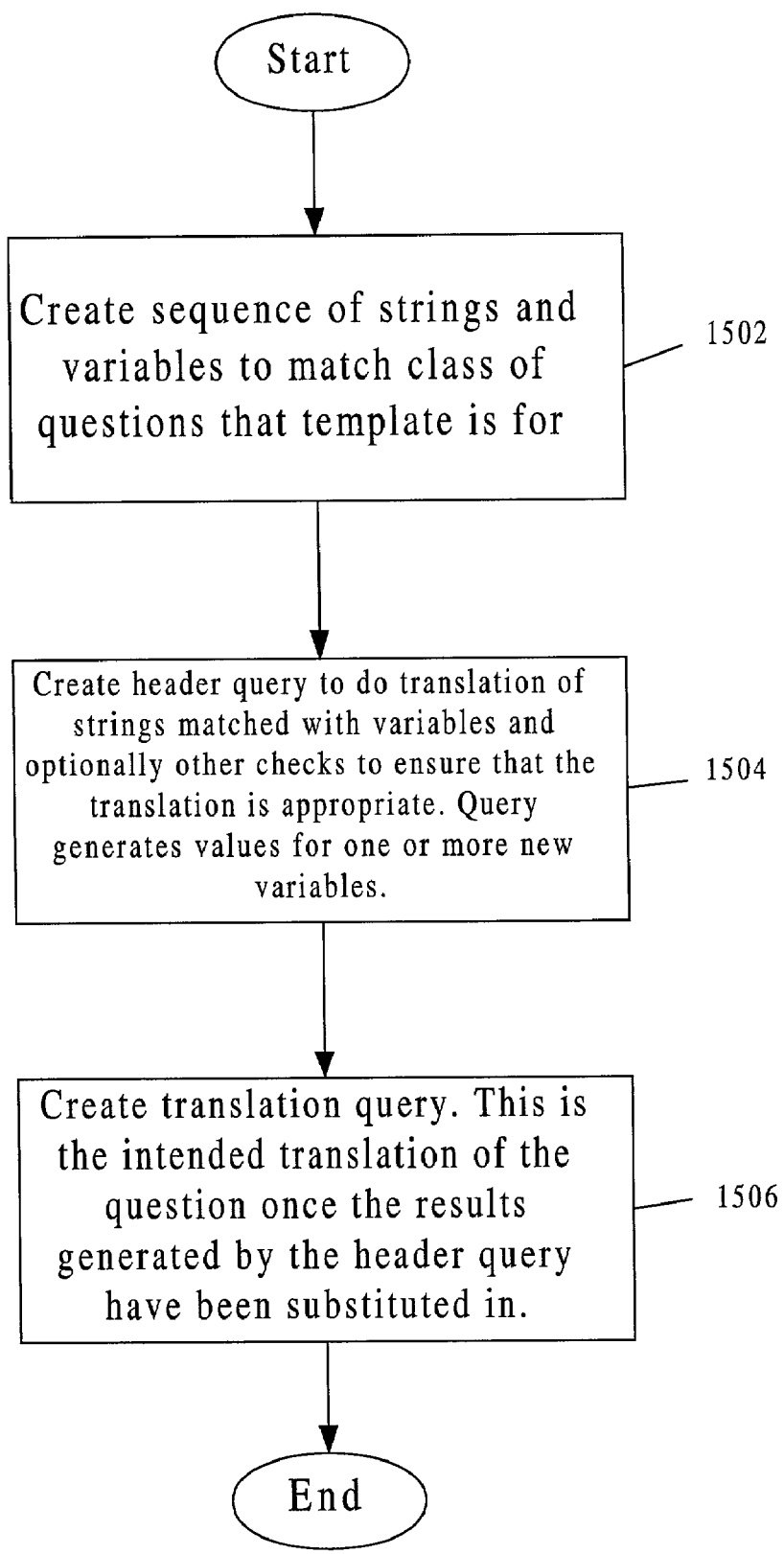
FIG. 15. illustrates the process of creating a translation template.
Figure 16:
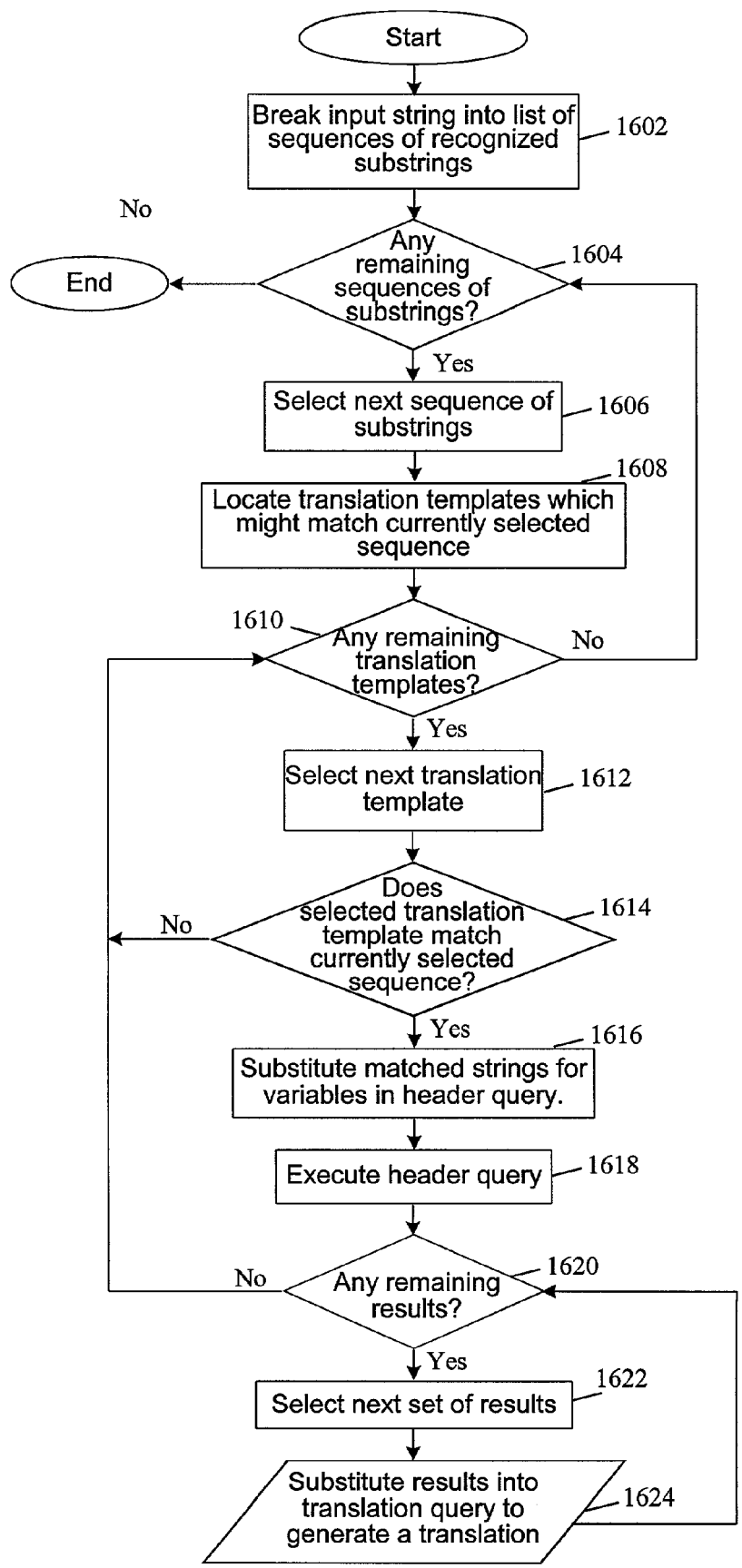
FIG. 16 illustrates the computer-implemented process of translating a natural language question using the templates.

The process of creating a translation query is illustrated in FIG. 15 and the process of using one or more translation queries to translate natural language questions is illustrated in FIG. 16.

Step 1502 is the act of creating the sequence of known and unknown strings that define the class of questions the template is for. Variables are used in place of the unknown strings. Step 1504 is then done which is to create a header query using these variables to check whether the translation should be taken further and to generate values for use in the translation. Step 1506 is to specify the translation query. This is a query but can also contain variables from the results of the header query. When a translation is made using this template these variables will be textually substituted from results taken from the header query.

Step 1602 is to break the natural language question into sequences of recognized substrings. Step 1604 checks to see whether there are any unprocessed sequences left and ends the process if there are no more (or none to start with). If there are sequences still to be examined, the next one is selected (step 1606) and all translation templates that might translate this sequence are then looked up (step 1608).

Step 1610 checks to see whether any of these possible translation templates remain and returns to step 1604 if not, otherwise it proceeds to step 1612 where the next unprocessed translation template is selected. Next the current translation template is compared with the current sequence of strings (step 1614) and if they do not match then control is passed back to step 1610. (These steps ensure that every sequence is matched with every possible translation template that might match.) If the do match step 1616 is then done and substitutions are created between the variables in the template representing unspecified strings and the strings that actually appear in the sequence. These string objects are substituted for those variables in the header query. Step 1618 which executes the query is then done. Step 1620 sees whether any results from this query are still to be processed and if so it selects the next set (step 1622) and substitutes the results into the translation query to produce a possible translation (step 1624). If not, it returns control to step 1610.

3.1.1 Resolving Ambiguity

Ambiguity is where the translation process produces more than one result. Ambiguity can sometimes be resolved from other information in the knowledge base. In the above "what is the capital of france" example the initial query only returned one pair of results and the question could not be made to match any other translation template.

However if the initial query had produced several results: for example if "France" could be resolved to the name of a person the translation can be rejected by using facts about the class that the right object of [is the capital city of] has. e.g. in the knowledge base is the following fact (shown without a name):

[geographical area] [is the right class of] [is the capital of]

All the queries generated by the translation process can be subjected to type checks using such knowledge. Any line with the relation [is the capital of] would then be subjected to checks on its right object. If it turned out that it was not an instance of [geographical area] the translation would be rejected.

If more than one translation remains then the engine can resolve ambiguity as a last resort by asking the user for more information. It does this by translating the queries back into English and listing them on the screen. The user then selects the query that he or she intended to ask. Although individual words and phrases translating into multiple objects are a common cause of ambiguity, different translations may also come from different translation templates.

[is the right class of] and [is the left class of] are permanent relations. Furthermore, in the preferred embodiment the classes they indicate are always permanent classes. This simplifies the ambiguity resolution as there is no need for temporal partners.

Figure 18:
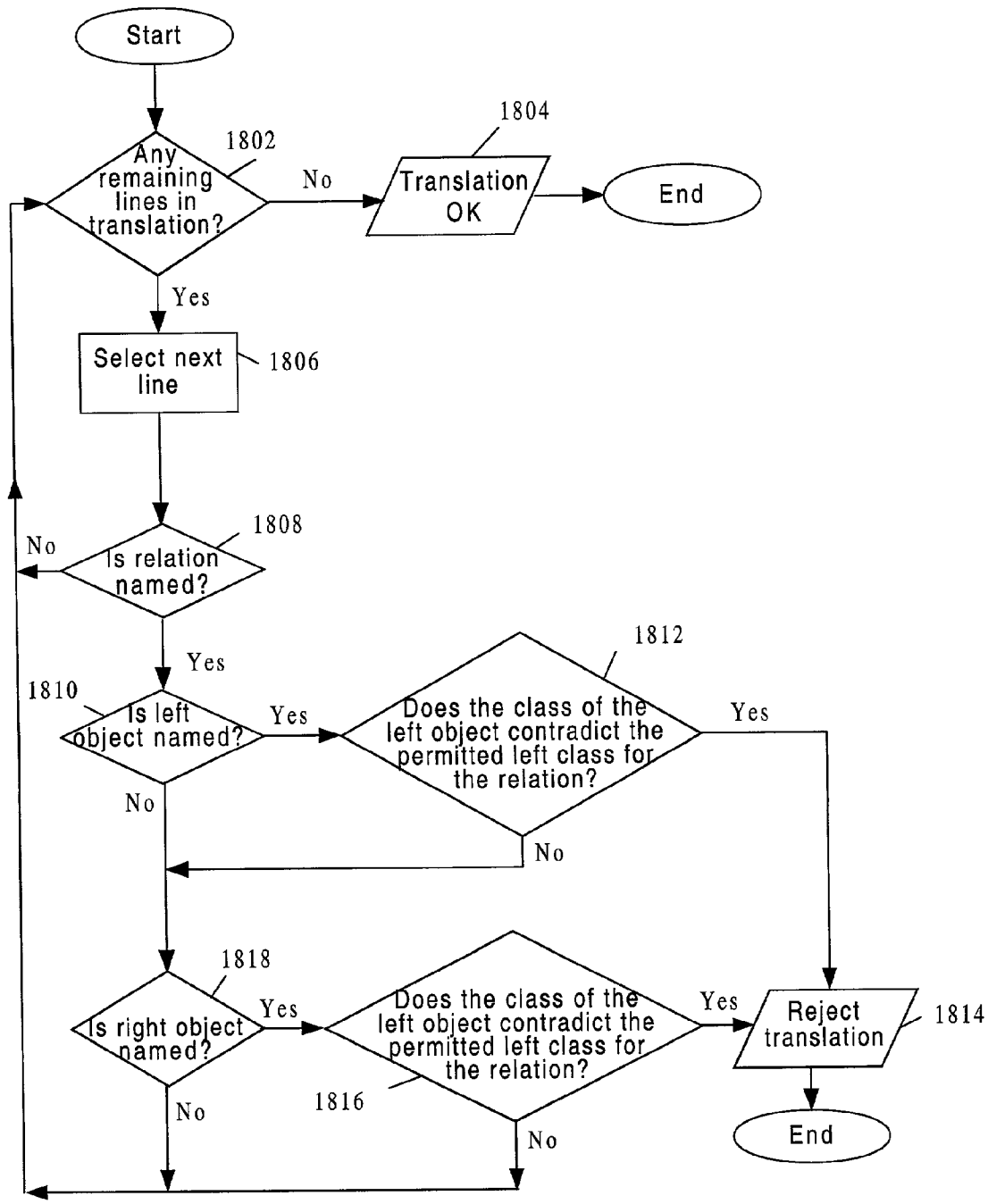
FIG. 18. illustrates how some translations are rejected.

FIG. 18 shows the process of testing a single translation to see whether it can be rejected. Step 1802 sees whether there are any remaining lines in the current translation that have not yet been tested. If not, the translation is declared OK (step 1804) and the process ends.

If there are remaining lines, the next unchecked line is selected (step 1806) and a check is made to see whether the relation in the line is a variable or a known object (step 1808). If it is a variable, control is passed back to step 1802 otherwise a check is made to see whether the left object is named (step 1810). If yes, the knowledge base is consulted to see whether the allowed classes of the relation determined by [is the left class of] facts contradict the actual class of the left object (step 1812). If they do the translation is rejected (step 1814) and the process ends. If the information is not there or the class is OK control passes to step 1818. Control also passes to step 1818 if step 1810 determines that the left object is not named (it is a variable). Step 1818 checks to see whether the right object is named. If not, control returns to step 1802 otherwise step 1816 is done which checks the knowledge base to see whether the allowed classes of the relation determined by [is the right class of] facts contradict the class of the right object. If they do, as before, the translation is rejected (step 1814) and the process ends, otherwise control is passed back to step 1802.

Figure 17:
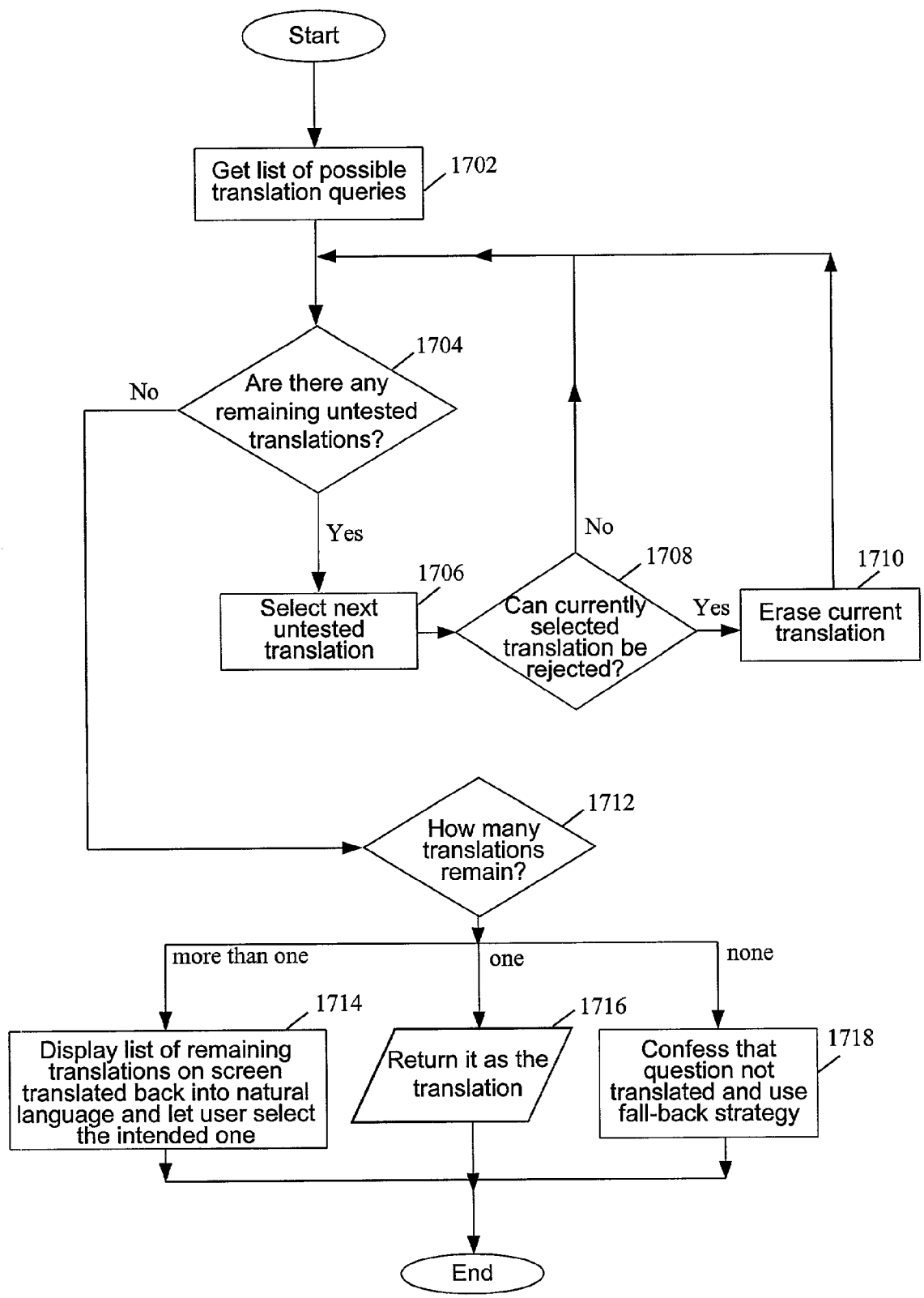
FIG. 17. illustrates how ambiguity is dealt with by post-processing a list of possible translations.

The process of dealing with the results of translation, including rejecting ones that can be rejected, presenting possibilities on the display and using a fall-back strategy (below) is illustrated in FIG. 17. Step 1702 obtains a list of possible translation queries (possibly using the process illustrated in FIG. 16 described above). Step 1704 tests to see whether there are any remaining translations and if there are not it advances to step 1712. If there are, the next one is selected (step 1706) and it is tested to see whether it can be rejected (step 1708). This step perhaps uses the process described in FIG. 18 as explained above. If it can be rejected it is deleted (step 1710) and control returns to step 1704.

Figure 5:
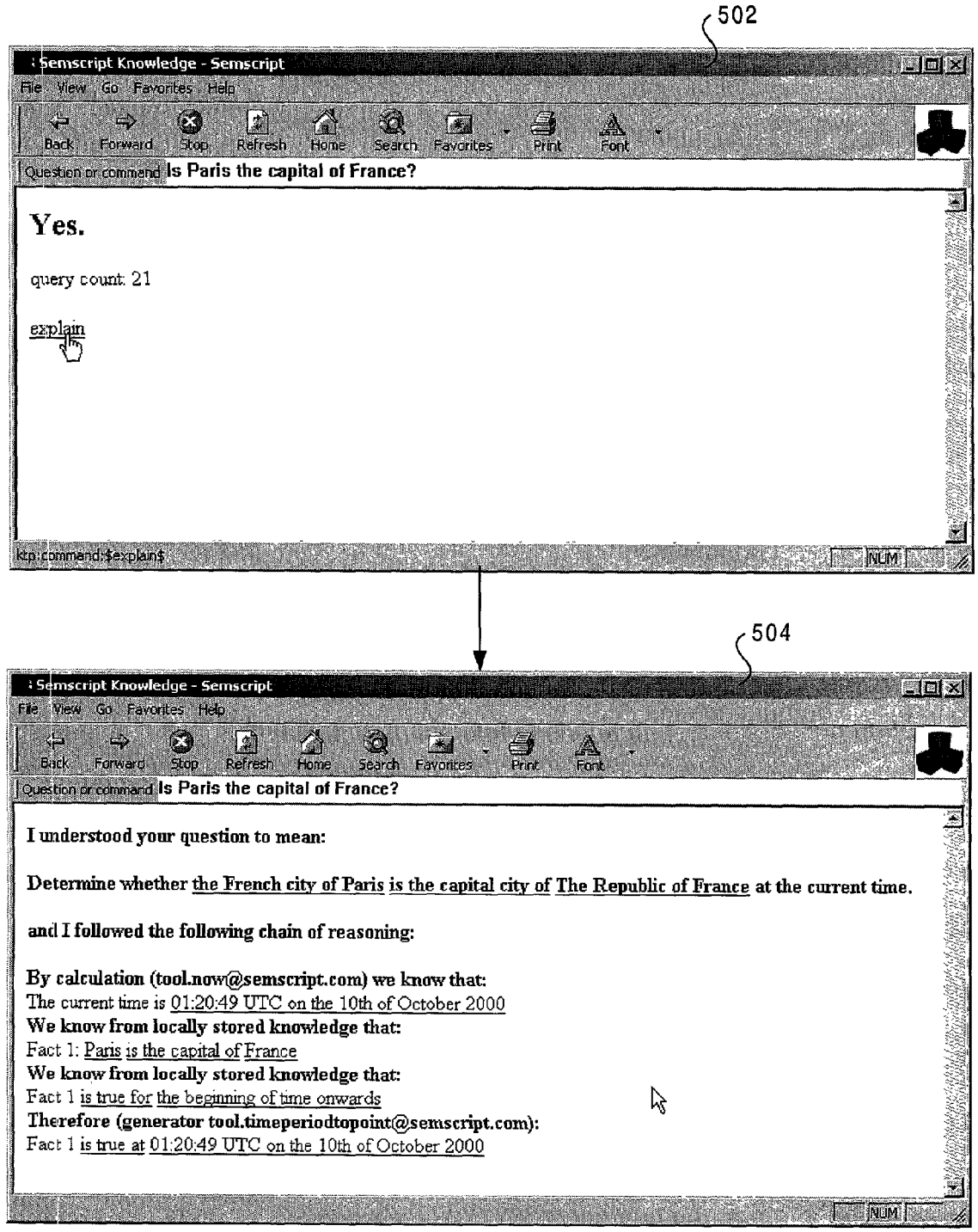
FIG. 5. shows the immediate response to another potentially ambiguous question where all the non-geographical interpretations of the word "Paris" were rejected to produce only one correct interpretation.
Figure 6:
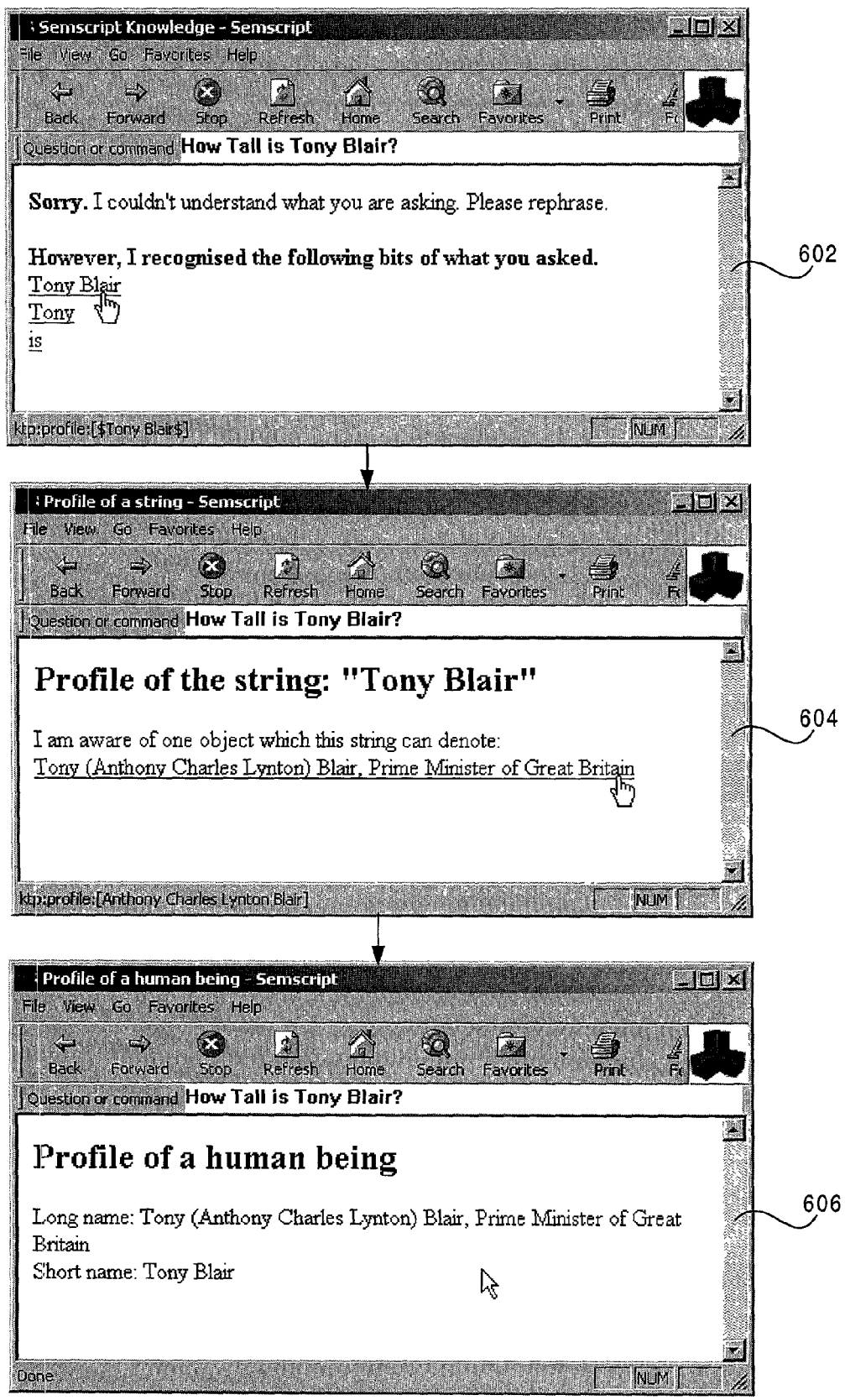
FIG. 6. shows the fall-back strategy used by the invention when a question is not understood. It also shows a profile screen generated when the human operator clicked on the "Tony Blair" link and a further profile screen when the link on the first profile screen was clicked.

Once all the translations have been examined it proceeds to step 1712 which tests to see how many translations remain. If more than one translation remains step 1714 is done and all the remaining translations are displayed on screen and the user is requested to select the intended one (an example being illustrated in FIG. 4 and described in more detail below). If exactly one translation remains it is assumed to be correct and presented as the answer (step 1716). (FIG. 5 illustrates an example where this step is executed and is described in more detail below). If no translations remain step 1718 is done where the system confesses it was unable to translate the question and uses a fall-back strategy. An example of this fall-back strategy being used is shown in FIG. 6 and described in more detail below.

Figure 4:
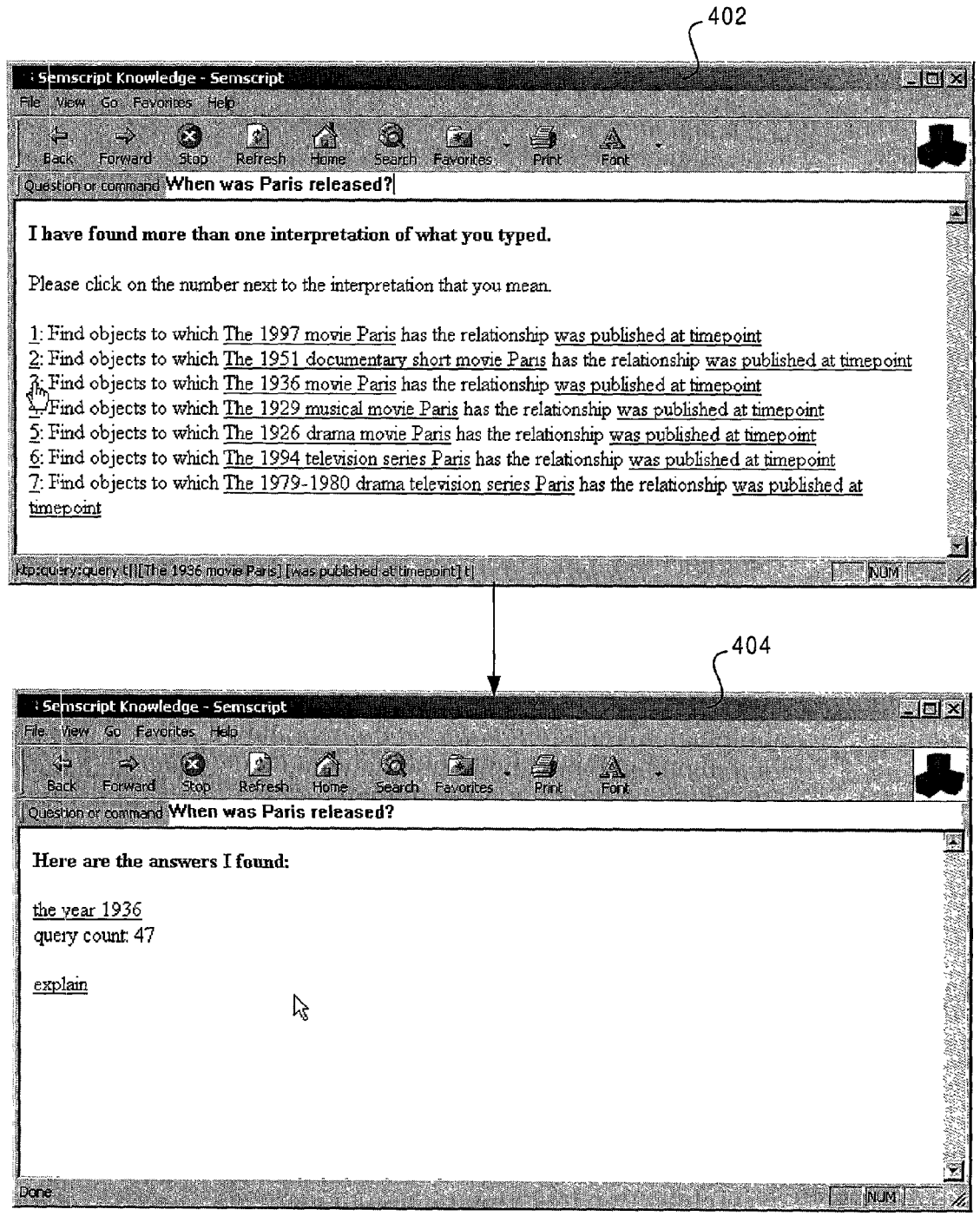
FIG. 4. shows the response to an ambiguous question where the natural language question can mean a number of different things. It also shows the result after the human operator selected the intended question by clicking on a link encoding the true question in internal format.

As an example, FIG. 4 illustrates how the question "When was Paris released?" would be dealt with.

The system found eight translations for the string "paris" and created queries for seven of them. The one involving the city in France was then rejected by the translation template because the initial query asked for the translation to be a [animated visual medium] (but it might also have been rejected later by checks saying that the left class for [was published at timepoint] had to be a [animated visual medium]). Because more than one possible translation remained, the possible results were translated back into English and presented to the user to select from (screen 402).

The link under each possible question number shown in screen 402 is an encoding of the query that corresponds to each translation. This is done by recoding the query into a pseudo-URL starting "ktp:" and implementing a protocol handling method to catch such URLs, convert them back into real queries and execute them.

For example the link under 3 is:

ktp:query:query t ∥ [The 1936 movie paris] [was published at timepoint] t∥ i.e.

query t

[The 1936 movie paris] [was published at timepoint] t (The "∣" character replaces the new line characters so the query can be encoded into a single line.)

Clicking on "3" produces screen 404 showing the answer to the intended question.

Figure 21:
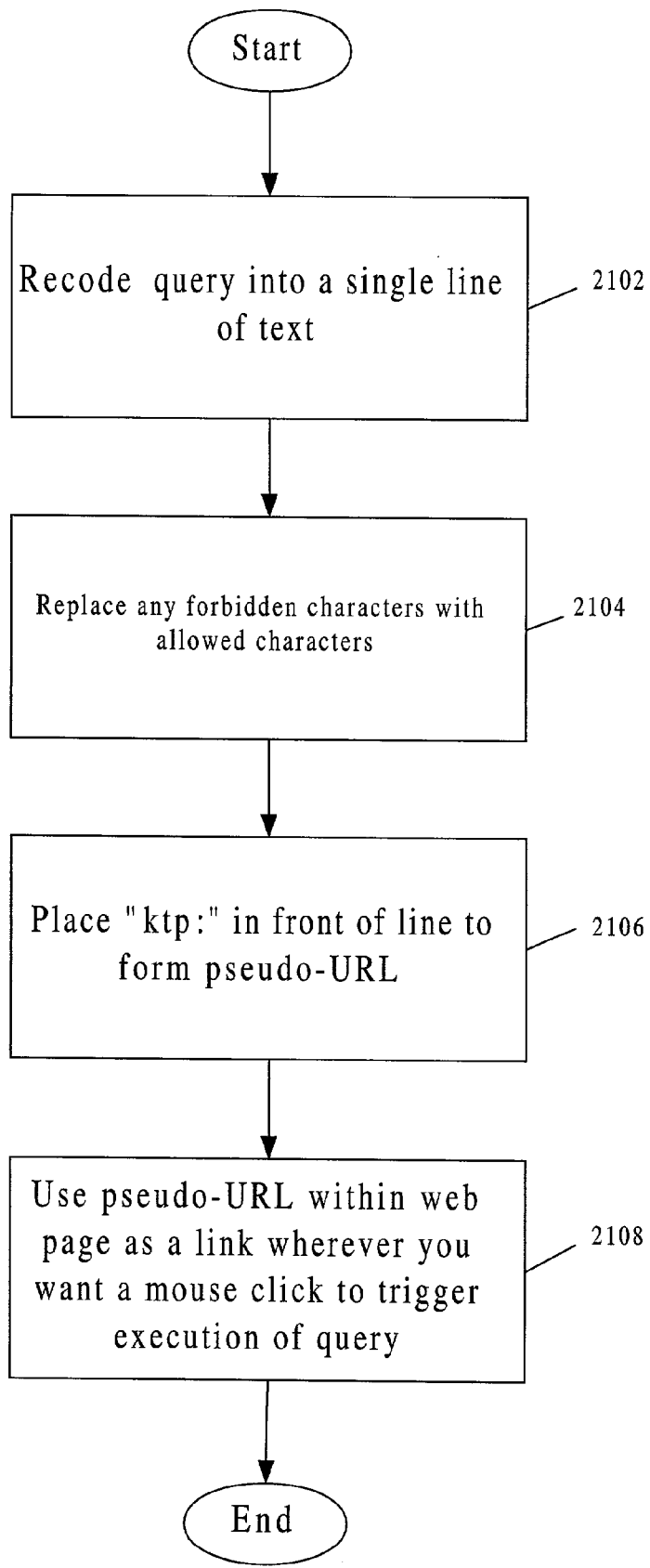
FIG. 21. illustrates the process of encoding a query within a web page.

The process of forming one of these is illustrated in FIG. 21. Step 2102 is to recode the query into a single line. If any forbidden characters are present they are translated by substituting them with unique sequences of allowed characters which can be substituted back later (step 2104). "ktp:" is then placed in front of the string (step 2106) to form a URL-like link and this link is then used within web pages (step 2108).

In contrast, with the question "Is Paris the capital of France?" illustrated in FIG. 5, things are different. Again many interpretations of the string "paris" are tried and this time the translation template does not reject any of them because it is very general and works for all relations. However, this time all the non-geographical interpretations are rejected by analyzing the queries using the [is the right class] and [is the left class] fact. Here all queries containing lines similar to:

t: [the 1997 movie Paris] [is the capital of] [france]

are rejected because the engine finds that:

[geographical area] [is the left class of] [is the capital of]

and proves that:

[the 1997 movie Paris]~[is an instance of] [geographical area]

The one remaining query is the one asking whether Paris the city is the capital of France and this one is not rejected so the query can run instantly without prompting the user as only one interpretation remains. As a result the system instantly answers the question and displays the result (screen 502). This instant response to the question is also step 1716 in FIG. 17 (described in more detail above).

As before if the user clicks on the "explain" link the system produces a natural language explanation (screen 504).

3.1.2 Natural Language Translation Fall-Back Strategy

If the engine fails to translate the natural language text entered by the user it can do better than simply say "Sorry". In the preferred embodiment (and implemented in the source code listing as an appendix), the program lists all the sub-strings of the question that it has recognized. This information gives feedback to the user about how close the system came to understanding the question and what bits were not understood.

Clicking on any of the strings that were recognized gives a profile screen for the string object. This profile screen includes any objects that are denoted by the string. Clicking on those gives a profile screen for the object. It is possible that a standard profile for a recognized object will answer the question that the user asked even though the question was not fully understood. (Profile screens are discussed in more detail below.)

FIG. 6 illustrates an example where the question "How tall is Tony Blair?" was entered.

The system first confessed to not understanding the question and listed the parts of the question it recognized (screen 602). Clicking on "Tony Blair" executed the ktp command ktp:profile:[$Tony Blair$]

which produces a profile screen of the object ["tony blair"] (dollar characters replace the double quote character in order to overcome problems with putting links in the HTML). Note that this is the string object not the person. The results of profiling this string are shown in screen 604.

Clicking on the link at the bottom of the string profile executed the ktp command ktp:profile: [Anthony Charles Lynton Blair] which is the object denoting the person) This produced screen 606.

Clearly this profile could include a great deal more information than shown including photographs, date of birth, occupation etc.

3.2 Translation to Natural Language

The translation to English (or any other natural language) is done using a variety of techniques. Some of the basic relations used for translating this way around are:

[commonly translates as] which relates an object name to a string giving the usual English term. However, several different objects may also translate to this string so it does not necessarily uniquely identify the object. The advantage of this relation is that it keeps the translations short.

[uniquely translates as] which gives a long (potentially pedantic) translation which is hoped to be unique. The virtue of this version is that it uniquely identifies the object in plain English with little chance of ambiguity but it contributes to highly wordy translations when used.

For example, the following two facts give translation information for Bill Clinton.

[fact.000147@semscript.com]: [William Jefferson Clinton] [commonly translates as] ["Bill Clinton"]

[fact.000148@semscript.com]: [william jefferson Clinton] [uniquely translates as] ["William Jefferson Clinton, the 42nd President of the United States"]

If the engine wants to informally translate the object [William Jefferson Clinton] it displays "Bill Clinton" which in most situations is sufficient even though there are probably other Bill Clintons in existence. If it wants to be absolutely sure to identify the correct person, it displays "William Jefferson Clinton, the $42^{nd}$ President of the United States" which guarantees to denote a single individual. For other individuals, date and place of birth could be included in the unique translation or any other information which might distinguish that person from people with the same name.

Relations are provisionally translated into a present-tense verb phrase. This can be modified to a negative or to an alternative tense using the rules of English grammar.

One of the important things involving translation that the preferred embodiment does is to generate a justification for its answer to a query. This is essentially all the facts and generators that it used to find the answer listed into a proof that reads in plain English. Such proofs are important because they demonstrate where the answer "magically" produced on the computer screen came from thus greatly improving the confidence the user has in the result. Moreover, although the results may have come from a computer, a human being ultimately has to use that knowledge and take responsibility for its accuracy.

The way that this is implemented in the preferred embodiment is by use of a data structure which is essentially a linked list of items where each item can either be a string containing a line of natural language (typically describing an event in the processing of a query), or a fact. This data structure can either hold the entire explanation or the explanation for some part of answering of the query.

During the processing of a query, many smaller queries are executed because many of the lines in the query involve the use or possible use of generators and the header queries in the generators need to be run. Some of these generator queries succeed and some fail—when they succeed, the explanation for those queries forms part of the complete explanation. To complicate matters further, some of these generator runs produce facts which go into the cache and the fact is then subsequently found in the cache rather than from running the generator again. It is important that when this happens, the original explanation for how the fact was generated before being placed in the cache forms part of the final explanation and if the fact has already been justified, it is not explained twice in the final explanation.

The way this is done is to store a full explanation with every fact placed in the cache. When a successful search of the cache is made and the fact pulled out, a check is made to see whether this fact has been previously used (and therefore justified) in the explanation of the lines of the current query done so far. If so, we just add a line saying something like "We already know that:"; if not we insert the entire explanation for the cached fact into the parent explanation.

This same process of adding the lines of an explanation into the parent explanation happens when we successfully generate facts from a generator. (The same query processing routine is called for the query header.) When it returns we take that explanation and insert it into the explanation for the current query with text lines to help understand how the facts were created. For example, we can insert a line like "Therefore:" along with (optionally) the name of the generator between the explanation for the header query and the footer lines of a generator. As generators are also called during the processing of queries in the headers of other generators, lines from explanation can end up being generated several levels of query-processing deep.

The final step is to translate our data structure into English. The lines of English text are already translated but we still need to translate the facts in the explanation. The fact names do not mean much to the user and furthermore, we only need to translate the fact names if the fact is referred to later on. For this reason, we make an initial pass through the data structure to label fact names that form part of other facts. We then make a second pass, translating these referenced fact names into something simpler than their real names such as "fact 1", "fact 2" and creating a lookup table from the real name to the simplified name. Armed with these translations we can then go through and translate all the facts using these simple names for facts and the [commonly translates as] strings for other objects and relations.

3.3 Adding a New Object to the Knowledge Base

The translation information mentioned above is a very important part of the knowledge that should be added when making the Knowledge Base aware of a new object. If that information is not included it will be more difficult to communicate knowledge about the new object to a human user and it may be difficult for future users to discover whether a name already exists for this object.

Figure 11:
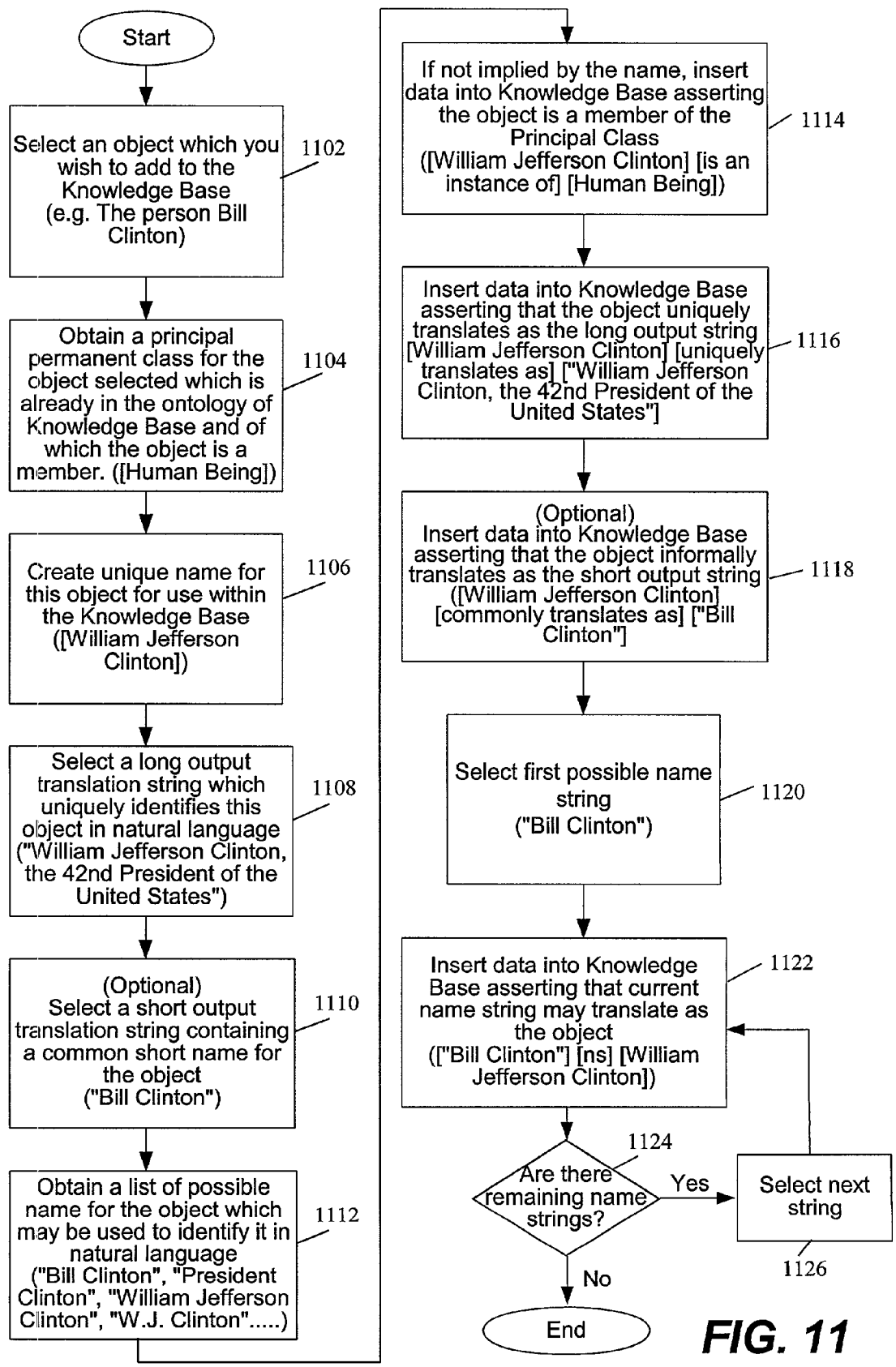
FIG. 11. illustrates the steps required to add a new object to a knowledge base.

FIG. 11 shows the steps involved in adding a new object to the knowledge base using the example of (the person) Bill Clinton. First the object to be added is identified (step 1102) and the ontology of the knowledge base is consulted to find the name of a permanent class for the object (step 1104). The next step is to create a unique name for the object (step 1106). In the preferred embodiment this might be a standard name creating by identifying an English noun phrase that uniquely identifies the object or alternatively a parametered name might be appropriate.

Next a long output translation string is identified as described above to uniquely identify the object to a human operator (step 1108) and optionally a short output translation string is identified (step 1110).

The next step is to find a list of terms that might denote the object in natural language. These can be used for translating natural language (e.g. natural language questions) into a form compatible with the invention. This step is step 1112.

Step 1114 is the act of recording the principal class of the object in the knowledge base. If the class can be inferred directly from the name (e.g. a parametered object in the preferred embodiment) then this step is not necessary and can be missed.

Step 1116 is to record the long output translation of the object in the knowledge base and step 1118 is to record the short output translation string if we have chosen to include one.

Steps 1120, 1122, 1124 and 1126 implement a loop where the list of terms for the object are recorded in the knowledge base.

4. Distributed Use of the Invention

Figure 8:
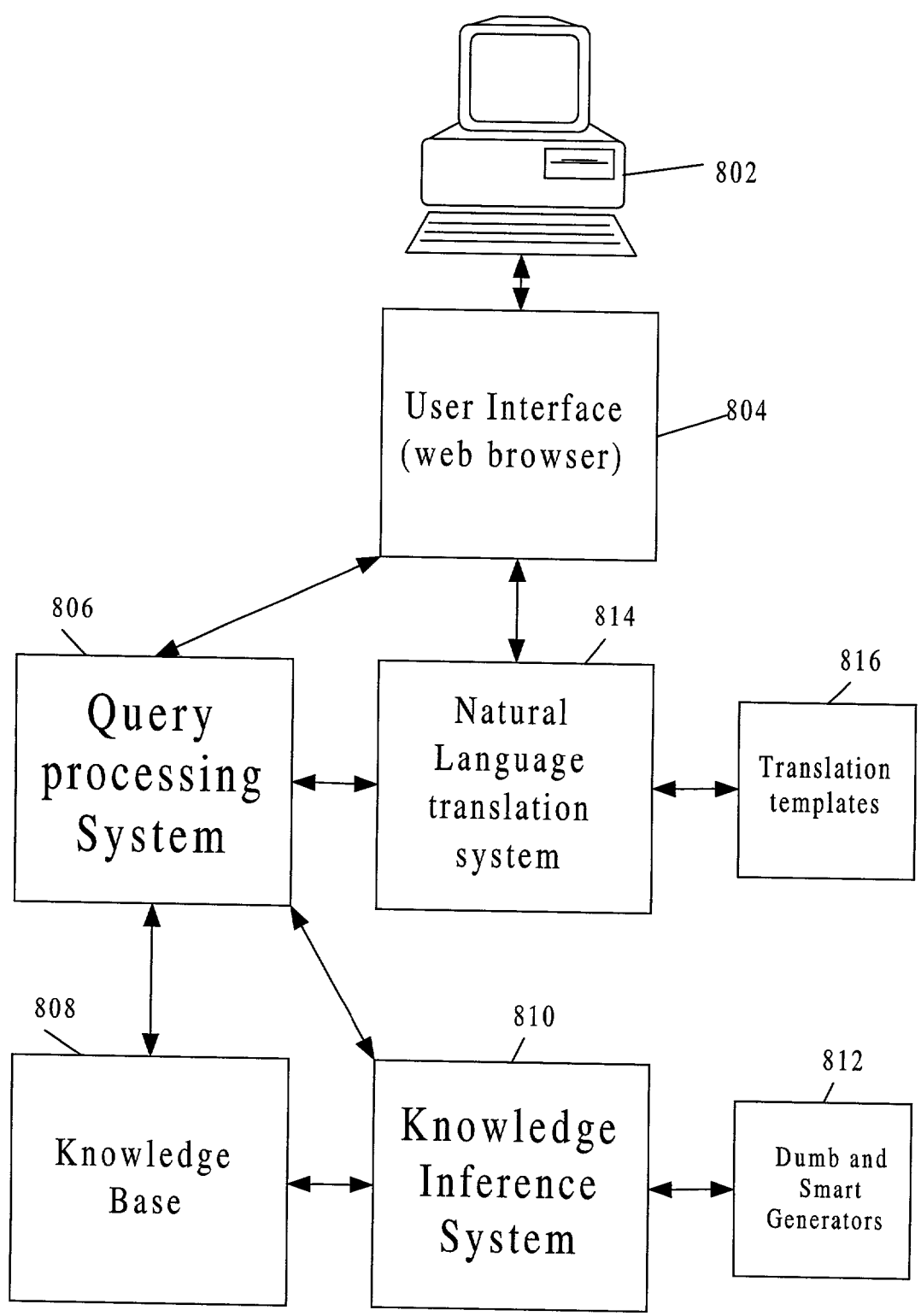
FIG. 8. depicts an embodiment of the invention on a stand-alone system.

The present invention can be implemented on a machine which where all the knowledge is stored locally. This machine does not need to be networked. This embodiment is illustrated in FIG. 8. The machine 802 includes a user interface 804 which is a web browser in the preferred embodiment and can be used to enter natural language commands. It also contains a query processing system 806 which answers queries in internal format using knowledge stored in the knowledge base 808 and also knowledge inferred by the knowledge inference system 810. The knowledge inference system infers new knowledge with the help of a store of generators 812. This stand-alone embodiment also includes a natural language translation system 814 which translates natural language by referring to a store of translation templates 816.

Another embodiment of the invention is for it to be used in a distributed manner with knowledge stored in a number of locations and knowledge transmitted over a network such as the internet. A very simple implementation is for the machines to simply access the static knowledge, generators and translation templates stored on a huge master machine somewhere on the internet or even to run an implementation of the present invention directly on a central machine via a web interface. This embodiment is practical, especially as this master "machine" can be mirrored on any number of servers and the clients divided up amongst the server machines to reduce the load.

However, a more distributed approach can be achieved by using a combination of facts about various machines (e.g. "semscript.imdb.com knows about movies") and a protocol similar to SMTP or HTTP for communicating between machines. This embodiment consists of server machines incorporating knowledge bases being interrogated over the internet for knowledge contained in their knowledge bases which are not present in the knowledge bases local to the client machines.

Figure 9:
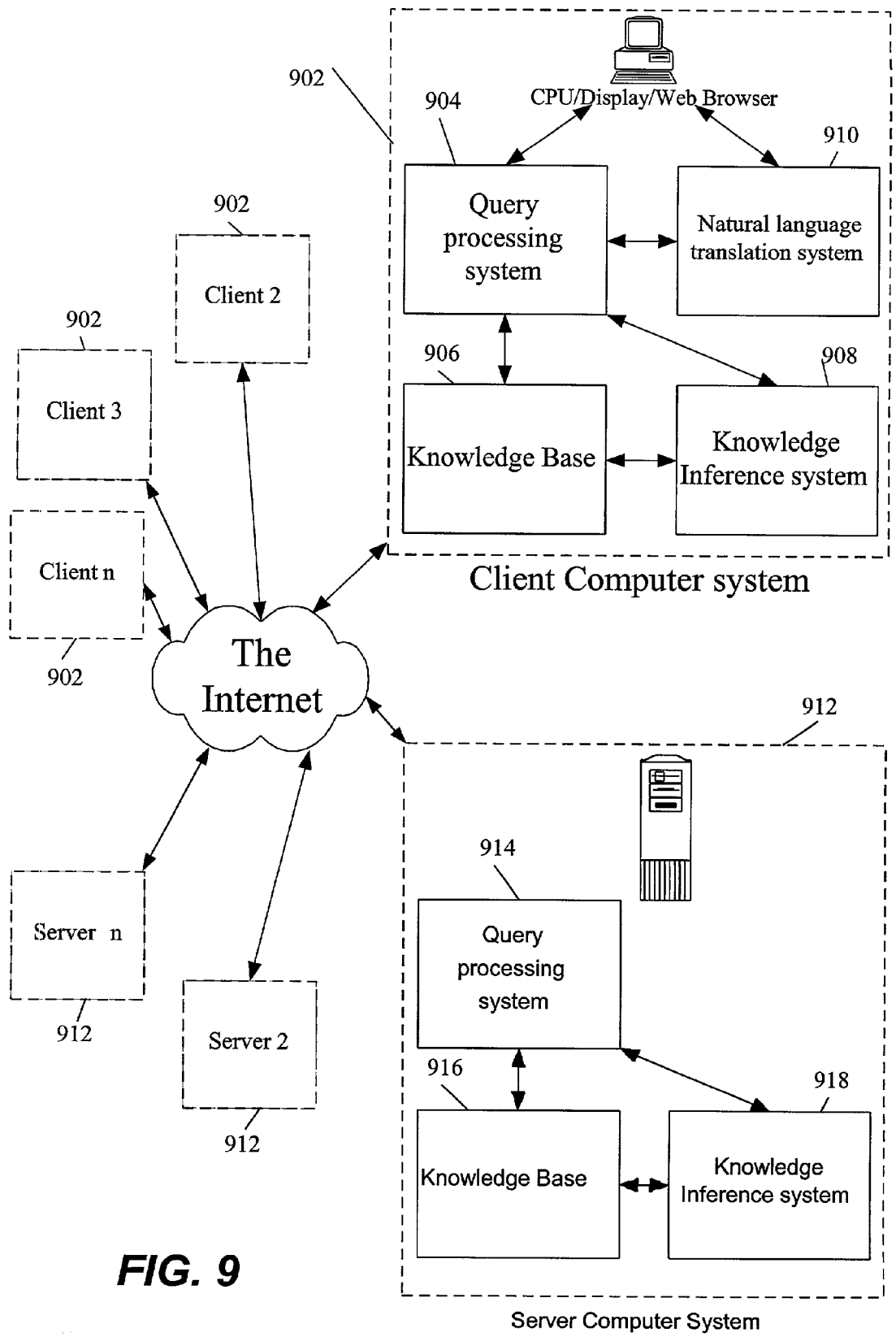
FIG. 9. depicts a distributed embodiment of the system where the internet is used to exchange knowledge between a number of clients and servers.

This embodiment is illustrated in FIG. 9. The client machines 902 contain a local system for processing queries 904 which refers to a local knowledge base 906 and knowledge inference system 908. They also contain a natural language translation system 910 for converting natural language to and from the internal representation. However, they can also consult with server machines 912 over the internet and gain access to knowledge stored on these machines which is not present in the client machines. These server machines use a query processing system 914, knowledge base 916 and knowledge inference system 918 of their own.

4.1 Expertise Facts

Expertise facts are facts about which machines on the internet know about various things. e.g.

[internet node: ["semscript.whitehouse.gov"]] [knows about] [William Jefferson Clinton]

states that the (presently hypothetical) White House knowledge base should be on the list of machines to be consulted about Bill Clinton.

Some knowledge bases contain expertise on a class of objects. e.g. the people maintaining the internet movie database may create a server and semscript.imdb.com would then know about objects in the class [animated visual medium] which includes movies, TV series etc.

The preferred embodiment is that a client will first try to answer any query from locally stored facts. If that fails, it will look for locally stored expertise facts and start a search on those machines. If both the local attempt to answer the query and a search for expertise facts fails, the client will go to the master machine. This is a central machine (or mirrored network of machines) on the internet which can be regarded as the center of the GKB. That machine will either provide facts that will enable the client to answer the query or will refer the machine to one or more alternative machines and the process repeats. A record of tried machines needs to be maintained to avoid looping.

All facts communicated over the internet will be stored locally once received so that they can be used again without having to make another remote query. However, to avoid the problem where stale information is stored long-term, all such facts gathered this way are made to expire after a predetermined interval. A routine housekeeping operation for the local client is to either purge such facts from the local knowledge base or to query the machine that owns the fact (referenced in the fact name) and ask it to verify whether the fact is valid is not. This can be done with a simple query:

query f f: [object 1] [object 2] [object 3]

where [object 1], [object 2] and [object 3] are the three objects after the name in the fact being checked. If f matches the name, the fact is kept (a new expiry date is added for a date later in the future) otherwise the original fact is erased from the local knowledge base.

Essentially a combination of expertise facts and referrals to other machines implement a distributed protocol where much of the world's knowledge can be stored in a distributed fashion.

Another desirable part of the process is that remote machines can answer with more facts than are strictly necessary to answer the query. These facts can be information that a commercial entity wants spread—for example information about its products. The ability to pass on commercially valuable information when providing a useful service for another machine gives an incentive for providers of information to be useful. Providers of information could even be paid for spreading commercial knowledge relating to third parties.

4.2 Knowledge Transfer Protocol

Knowledge Transfer Protocol (KTP) is part of various embodiments of the present invention and a way machines can communicate knowledge over the internet and implement the above ways of retrieving knowledge in a distributed manner. It is designed to be an asymmetric text based request/reply protocol like many of other main TCP protocols (e.g. HTTP, SMTP etc.) for which the source code to many clients and servers are freely available. Anyone familiar in the art of implementing these protocols should thus have no difficulty implementing a new one from a list of commands and a port number. A knowledge server (a machine publishing facts on a network) listens on an allocated port and clients make requests to the port to retrieve facts and other services from the machine.

Many possible embodiments are possible and will be obvious after reading the description that follows. The preferred embodiment is the following:

4.2.1 KTP Commands:

IAM [object]

This is the start to any session and says that the entity making this request is [object]—this object will probably be an instance of [human being], [legal entity] or [computer]. This information might be useful for billing or payment protocols or to allow the server to only service certain people or businesses (after the addition of authentication protocols) or to prioritize between businesses. Adding payment or authentication protocols is a matter of selecting an appropriate method from the wide variety of payment and/or authentication methods that exist and implementing this communication using additional commands.

RUNQUERY ESTABLISH

"Please run the following query on your machine in establish mode"

RUNQUERY FULL

"Please run the following query on your machine in full mode"

Both the above commands are then followed by the query itself.

The server responses to the query are either:

YES

A definitive affirmative answer to a truth query.

NO

A definitive negative answer to a truth query.

NO/UNKNOWN

A negative response to a truth query in establish mode.

UNKNOWN

Cannot answer this query which was run in full mode.

COMPLETE <n>

Where n is a number says "There are n answers to this query."

FOUND <n>

"I know n answers to this query"

INCOMPLETE <n>

"Here is an incomplete list of n answers."

These are followed by a list of answer in the following syntax:

<variable>=[object name]

Each are grouped together if there is more than one variable in the query. e.g.

a=[France]

b=[Paris]

a=[United States of America]

b=[Washington D.C.]

If the query had two query variables a and b and there were two answers.

Another response to a query request is:

REFUSE <optional explanation>

Which means that the server won't answer. The REFUSE keyword is followed by an optional natural language explanation of why not. e.g.

REFUSE Server too busy.

Another response from the server which can optionally be appended to any unknown or incomplete answer is:

TRY

Followed by a list of internet machine names containing a KTP server to try. e.g.

TRY semscript.imdb.com semscript.abcinc.com

RUN <tool name> is a command from the client to the server asking for the named tool to be executed and the facts returned. Any parameters are sent on subsequent lines. e.g.

RUN firstletterof@semscript.com s$=["Paris"]

STRINGHELP <string> asks the remote server to provide facts that might help with the translation of a string. The server responds either with the REFUSE command (as above) or by trying to break the string up into recognizable substrings and providing all the translation facts it knows about for those strings. e.g.

->STRINGHELP "Demolition Man"

<-[fact.imdba291773@semscript.com]: ["Demolition Man"][ns] [The 1993 movie Demolition Man]

Armed with the translation facts, the client machine can then try to translate the string again, this time with a higher chance of success.

OBJECTHELP <object> asks the remote server for help with a named object. The server responds with REFUSE or with all the core facts relating to that object. For a relation this is its core attributes and translation facts. For other objects this the classes it belongs to and other core attributes. e.g.

->OBJECTHELP [The 1993 movie Demolition Man]

<-[fact.imdba291770@semscript.com]: [The 1993 movie Demolition Man] [is an instance of] [big screen movie]

<-[fact.imdba291771@semscript.com]: [The 1993 movie Demolition Man] [uniquely translates as] ["The 1993 action comedy sci-fi movie Demolition Man"]

<-[fact.imdba291772@semscript.com]: [The 1993 movie Demolition Man] [commonly translates as] ["Demolition Man"]

<-[fact.imdba291774@semscript.com]: [avm attribute action] [applies to] [The 1993 movie Demolition Man]

<-[fact.imdba291775@semscript.com]: [avm attribute comedy] [applies to] [The 1993 movie Demolition Man]

<-[fact.imdba291776@semscript.com]: [avm attribute sci-fi] [applies to] [The 1993 movie Demolition Man]

<-[fact.imdba291777@semscript.com]: [The 1993 movie Demolition Man] [was published at timepoint] [timepoint: ["1993"]]

If a server has been useful, it can also send the client the following command:

FACTS followed by a series of unrequested facts. By protocol, if the server has been useful the client must store a reasonable number of additional facts that are sent this way. These additional facts may include commercial information which the owners of the server are being paid to spread or it may be commercial information that the owners of the server wish to spread in their own right.

5. Other Details

This section describes various issues and techniques that do not readily fit into any previous section.

5.1 Common Properties of Relationships

Attribute objects are objects which semantically are properties of other objects. They are linked to other objects using the [applies to] relation.

Attributes are key to generators making useful inferences. For example, if we know that a relationship is symmetric we can generate facts with the two objects being related switched around. We only need one generator for this and when we create a new relation that has this attribute, the old generator will take account of the consequences of this property.

Common ones that apply to relations used in the preferred embodiment are:

5.1.1 [transitive]

[transitive] means that if a relates to b and b relates to c then a relates to c for the timeperiod that both overlap. e.g. [is geographically located within] is a transitive relationship. MIT being in Massachusetts and Massachusetts being in the USA implies that MIT is in the USA.

5.1.2 [left unique]

[left unique] means that if a is related to b and c is not a then c is not related to b for the time periods that a is related to b. [is married to] or [is the capital of] are examples. In natural language expressing a relationship with the definite article ("the" in English) often implies this: "is the husband of", "is the capital of", "is the father of" etc. Use of the indefinite article ("a") implies it is not [left unique] e.g. "is a child of", "is a parent of"

5.1.3 [right unique]

This is just like the [left unique] attribute but the it is the right object is the only one. Any relation that is [right unique] and [symmetric] is also [left unique] of course. However, some relations are [left unique] but not [right unique] and vice versa. For example, [is the genetic father of] is [left unique] but not [right unique] it is possible to father more than one child but it is not possible for a child to have more than one (genetic) father.

5.1.4 [permanent relation]

If the relationship is true for any moment in the time line it is true for all of it. This means that we can miss out the temporal partners for facts using such relations as they can be generated automatically if needed.

N.B. [is an instance of] is not [permanent relation] as it is possible for objects to cease being members of some classes. e.g. [John Smith 2] [is an instance of] [police officer] only applies for some of his life.

For [is an instance of] we can derive permanence of a fact from an attribute of the class. e.g. [permanent membership] [applies to] [human being] means that if [William Jefferson Clinton] [is an instance of] [human being] at any point then it will be for all time. [permanent membership]-[applies to] [police officer]

5.2 Permanent Classes—Successor objects

Every object is a member of at least one permanent class. It is useful to make that explicit and when you do so it is important to consider the concept of successor objects. Successor objects are completely new objects that replace another object when it is changed in such a fundamental way that it no longer can be considered a member of its main permanent class. i.e. instead of considering it to be the same object that has changed, we consider it to be a new object with a new name that has replaced the old object.

A morbid example of a successor object is that of a human corpse. A human corpse is not an instance of [human being]—many properties of instances of [human being] simply do not apply any more when someone is dead. However, if we gave someone's corpse the same object name as the living version of them, [human being] would cease to be a permanent class and every assertion about someone being a [human being] would have to be accompanied by explicitly stated temporal partners.

A better method therefore is to make [human being] a permanent class and have a completely new object for someone's dead body. As there is a fundamental link between a person and their corpse, a parametered object where the first parameter is the name for the living version of them is appropriate. The human being and the dead body are then regarded as separate objects within the universe and attributes, generators and facts can be used to assert information about when each object is present in the real world and how the time of death relates the two objects. Again existence of physical objects in the real world is different from existence in the knowledge base: the word "successor" in the phrase "successor" object refers to existence in the real world and the time line, not the object's presence in the knowledge base.

5.3 Completeness

Completeness is the issue of knowing whether the answers that have been given by an object query are a complete list of all possible answers: there may or may not be answers which are not in the knowledge base. It is checked for when a query is run in full mode.

The way it is done is by storing facts about how many objects exist for a template line in a query. If that number of objects is found and all subsequent filtering of them by successive lines in the query produces a definitive yes or no result we can be sure that the objects that emerge at the end of the query are a complete list.

We store information about number by the use of queryline objects.

Queryline objects are parametered objects that represent a possible line in a query (excluding the fact name). Each queryline object, therefore, has exactly three parameters. These parameters are either the special object [queryline unknown] which represents a variable or they are the names of specific objects. For example, the possible line of a query:

n [is a child of] [hugh tunstall-pedoe]

and all similar lines with another variable are represented by the single queryline object:

[queryline: [queryline unknown]; [is a child of]; [hugh tunstall-pedoe]]

To say that Hugh Tunstall-Pedoe has (has ever had) three children we then include the following fact in our knowledge base:

[fact.000269@semscript.com]: [queryline: [queryline unknown]; [is a child of]; [hugh tunstall-pedoe]] [has order] [integer: ["3"]]

If the engine is asked to gives completeness information to an object query (i.e. it is run in full mode), it starts by setting a flag indicating the completeness of the results to complete. This completeness flag can have three values meaning that the results are complete, incomplete or the completeness status is unknown.

For as long as this flag remains complete, the engine does extra work to determine whether the results it has found so far continue to be complete.

When it comes across an object generating line of the query. i.e. a line containing a variable that hasn't been used before, it first converts it to a queryline object and runs a second query to see whether there is a [has order] fact in the knowledge base. If there is not, the completeness flag is set to unknown and stays unknown for the remainder of the query. If there is, it compares the number of results found after executing the line with the number of objects known to exist as asserted by the queryline fact. If they match, the completeness status is preserved as complete. If the number of objects found is smaller than the number indicated the flag is set to incomplete. (If larger, there is an inconsistency in the knowledge base.)

Subsequent lines in the query may filter the objects found. i.e. the line may include only a variable used to generate the objects on a previous line so when reached it is tried as a mini truth query with each object substituted in. If the completeness flag is set to complete it then becomes important to do extra work if the object fails to pass through that line. If the answer can be shown as a "no" then the completeness status of the query so far is unchanged. If, however, it is unknown the completeness flag has to be changed to unknown as well. The method used to determine between no and unknown is exactly the same as the one used to answer a truth query with "no" described above: essentially the relation in the query line is made negative and any temporal partner is added to cover all the timeperiod specified—if this new query is found to be true we can answer "no" to the original mini-query and preserve the status so far as complete. If the completeness status going into a filtering line is incomplete, the completeness status changes to unknown afterwards no matter what the result: it is impossible to know whether the missing objects would have passed through the filter or not without knowing what they are.

Figure 7:
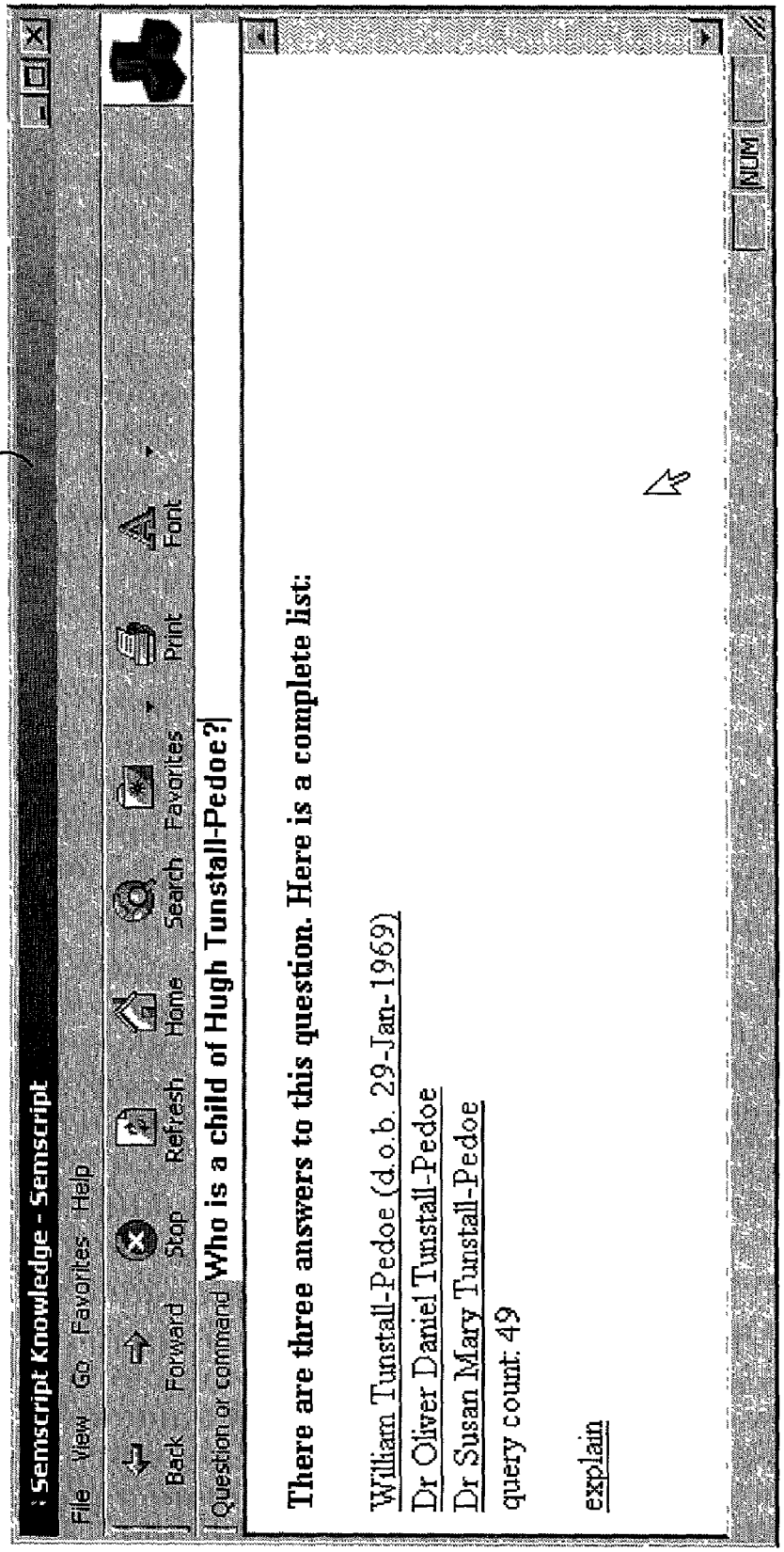
FIG. 7. shows a response to a query where the system is able to say that the answer is complete.

The prototype system (the source code of which is listed as an appendix) implements this. For an example see FIG. 7. The answers in screen 702 are introduced with the text "There are three answers to this question. Here is a complete list." With out the completeness check it could only introduce the list with "Here are the answers I found."

5.4 Unknown Objects

Sometimes it is important to write information about facts where the objects are unknown. This happens for example when data from an old database is automatically converted for use with the present invention or a knowledge "layer" is placed on top of an old database.

If the data includes people then the official object names for them (if they exist) are not stored in the database because they may not be known. Instead we just may have a text version of their name or another identifier (for example a social security number). Searching for and then assigning the object names to these people is the best way to do it but doing this completely automatically may be impossible: in the case of names there may be several people with the same name to choose from. To accommodate this a temporary object name can be assigned as described below.

In the preferred embodiment, if a name is in the form [unassigned.xxx.yyy@machine.on.internet] it is only guaranteed to be different from unassigned names owned by the same internet machine with the same group identifier (yyy). For example:

[unassigned.customer1.group1@smallco.com] is guaranteed to be a different person from [unassigned.customer2.group1@smallco.com] but may be the same person as [William Jefferson Clinton] or even the same person as [unassigned.person1.group2@smallco.com]

Having assigned these temporary names, facts to aid translation etc. can be entered in the database and the little information we do have also needs to be added.

If we subsequently discover the identity of an unassigned object or a real object name is assigned to it we can then replace all facts relating to it with ones where the name is specified. The important thing is that a mixture of real names and the temporary ones described will still work.

5.5 Data/Document Objects

Some very important objects are essentially data. Examples include pictures, HTML pages, longer blocks of text or other documents. It is impractical to name these objects using the data itself so in the preferred embodiment we give the data an object name. Having done that the internet already has a well-established way of retrieving the contents of such a file: URLS. URLs are named within the invention by using a parametered class [url] with a single string object parameter. e.g. [url: ["http://www.semscript.com/"]]. The relation [is the url of] relates the object name for a document to a URL which contains the document's data.

Document objects will often get "translated" by simply displaying their contents.

5.6 Integrating with the Web

Integrating the present invention with the web can be done by implementing the knowledge engine within a web browser. Text entered in the URL line is first checked to see whether it is a URL or URL abbreviation (e.g. "www.semscript.com" instead of "http://www.semscript.com"). If it is, the page is looked up as normal. If not, it is processed by the translation engine. (For an example, see FIG. 1 described in more detail below) This process allows the web browser to be used as normal but yet still incorporate the present invention. A new user can type a natural language question into the URL line of their web browser and have it answered by the technology described here yet also be able to use the application exactly like the web browser they are already experienced with. Similarly links clicked on by the user are also subject to checks. Lines starting ktp: are captured and processed by the knowledge engine within the browser, other lines are linked to as normal.

The prototype system (an embodiment whose source is listed here as an appendix) is actually a complete web browser. However, it is also be possible to integrate the invention into another browser by the use of "plug-ins" and support for alternative network protocols. A knowledge engine could also sit directly behind a standard web page, taking and answering questions from a standard web form.

In the preferred embodiment the output from the question is in HTML and various further actions relating to the present invention are encoded within a hyperlink starting ktp:. A single line encoding of queries is included in this syntax as is a way of profiling objects (described below).

5.7 Object Information (Profile) Screens

The client can display a page of the most basic information about any object in the knowledge base. The actual contents of this page will be determined by the smallest class of which the object is a member and for which a profiling method exists.

Figure 20:
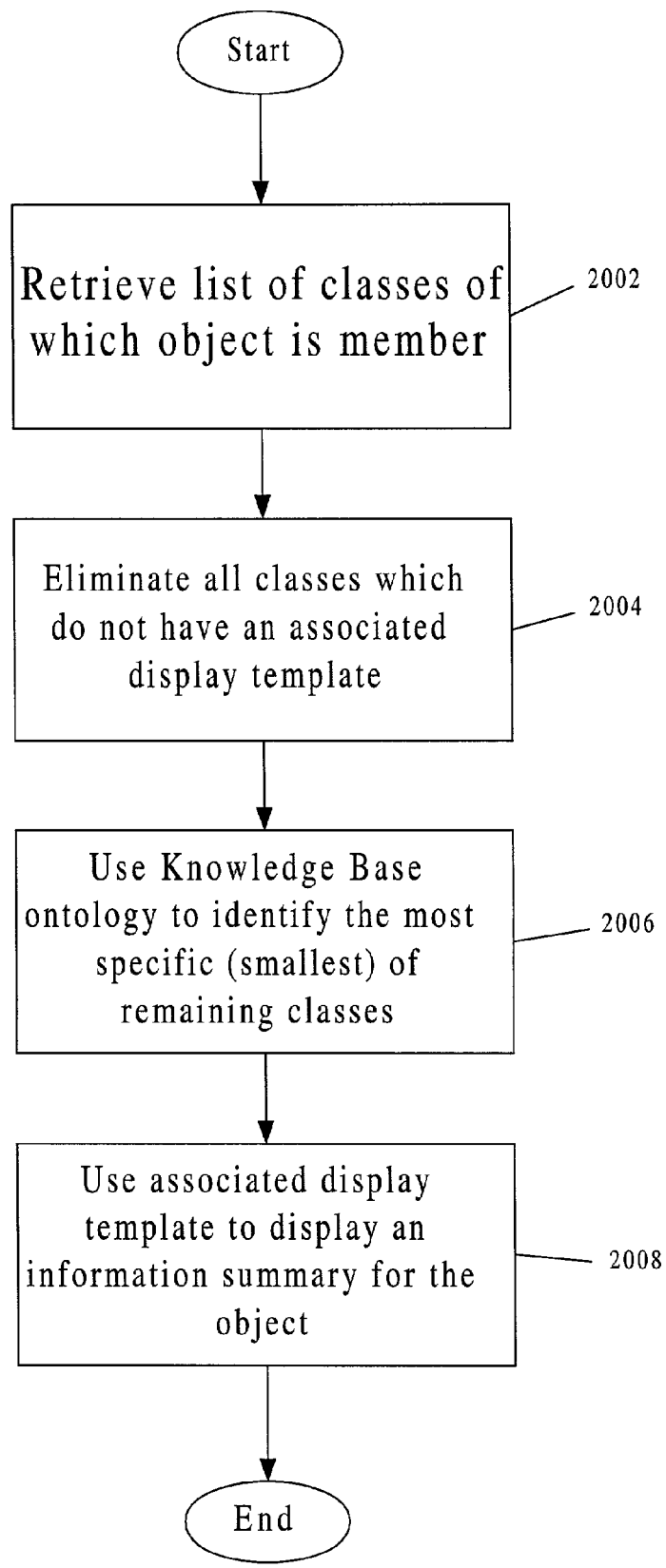
FIG. 20. illustrates the process of displaying a profile screen about an object.

One way of generating such a profile screen is illustrated in FIG. 20. Step 2002 is to retrieve the classes of which the profiled object is a member. Each class is then tested to see whether there is an associated display template and rejected if not (step 2004) and the most specific of the remaining classes is identified (step 2006). Finally the template of the most specific class is used to generate the information screen (step 2008).

In the preferred embodiment, the profile template is a mixture of HTML and other sections containing queries, the results from which are converted into HTML and inserted to form a final HTML page. The queries reference the object being profiled enabling a complete HTML page to be produced giving useful information about that particular object. The page could also include normal internet links for further information or links which generate other profile screens.

For example, a profile of a person could include age, height, names of family members and a recent photograph.

In the preferred embodiment the object information screens are processed by use of the parametered relation: [is the html profile of: <timepoint>]. This relation gives the name of an HTML document which profiles the object at time <timepoint>. The URL for the object can then be found using the relation [is the url of] and the profile displayed on screen.

The prototype system links to such profile pages every time an object is referenced elsewhere. The link is implemented with the ktp command profile which names the object to be profiled. To implement it the engine creates a query to find the html profile URL and it then displays it. Naturally such an object is unlikely to pre-exist—the creation of the document and URL is done using a smart generator. In the prototype system the tools powering these smart generators are hard-coded but they can also easily be implemented separately.

e.g. When the user clicks on the URL ktp:profile: [Anthony Charles Lynton Blair] the system immediately executes the following query:

query u
[current time] [applies to] now
p [is the html profile of: now] [anthony charles lynton blair]/1
u [is the url of] p/1

The generator that the engine calls to get the second (and third via the cache) lines answered is the following:

generator
=>profile@local
x [is the html profile of: y$] o$ *
q [is the url of] x The profile@local tool analyses the object and creates the HTML document—the URL is a local file. Notice how this tool does not have a query at the top—any object can be profiled so it is not necessary. When this document is run for the second line of the above query, the line specifying the URL is also generated and placed in the cache. The third line of the query is answered from there.

When the URL is returned, the system displays the HTML document on the screen.

6. Example Runs Using Prototype System

These examples are here to further illustrate and explain how the invention works and to show the capabilities of the prototype system and thus the benefits of the invention as a technology. The source code for the prototype system and sample data is included as an appendix.

The prototype implementation implements an embodiment that compiles into a web browser.

6.1 Web Browser integration

FIG. 1 shows a web browser displaying a URL in response to a command in the URL line as normal and then answering a simple question entered in natural language. Screen 102 shows the web browser when first opened after the user has entered a URL into the URL line 103. Screen 104 shows the web browser after it has correctly responded to the entering of the URL and retrieved and displayed the web page indicated by the URL. The web page is displayed in the browser window 105. Screen 106 shows the web browser after the user has then entered a natural language question into the URL line and screen 108 shows the web browser after the user's input has correctly been interpreted as a natural language question and been translated into a query, answered and the answer displayed.

Figure 19:
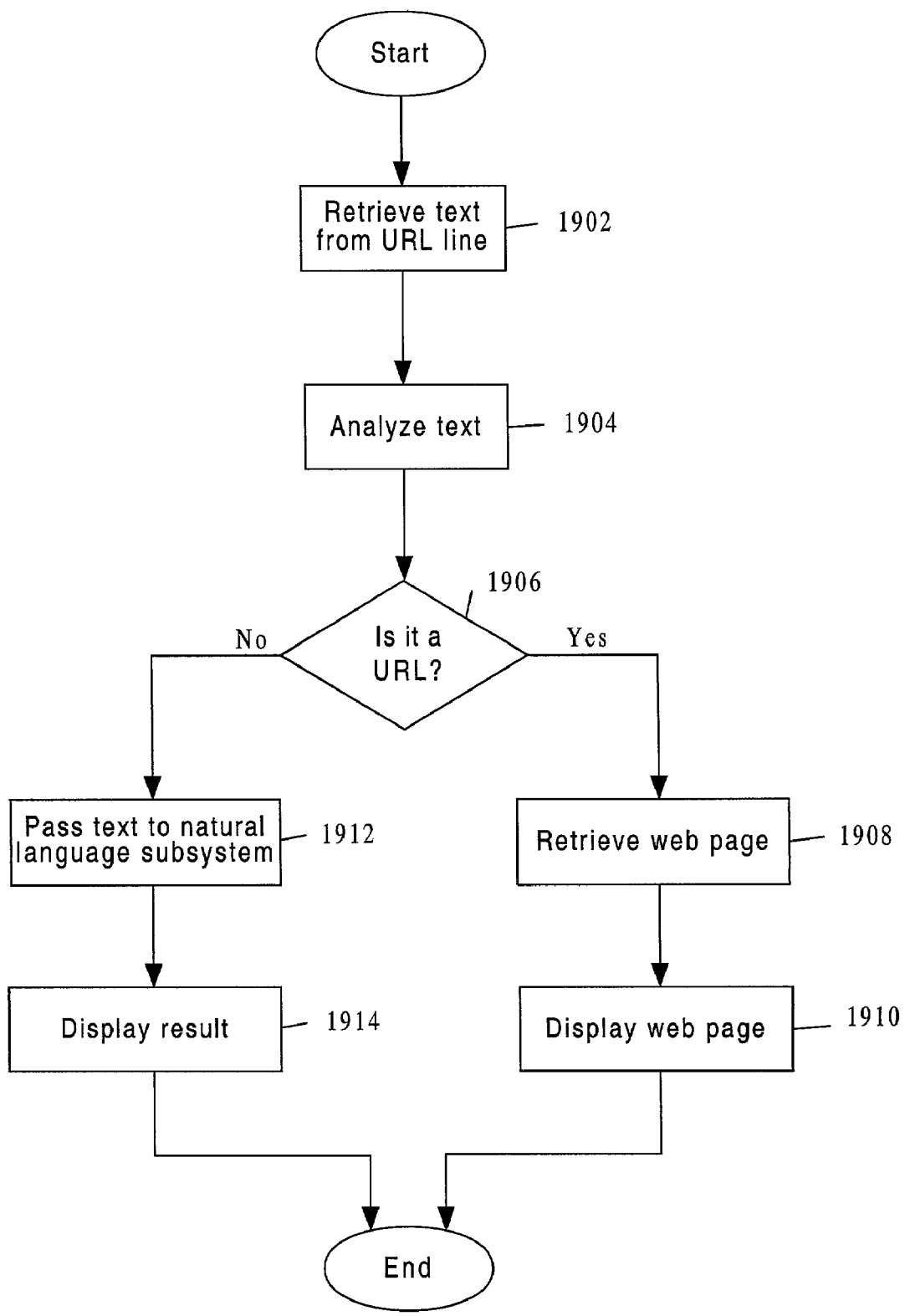
FIG. 19. illustrates a method of separating natural language questions and URLs typed into a web browser.

The process that the web browser uses to route commands from the user is illustrated in FIG. 19. Step 1902 is the action of taking the text that the user as entered from the URL line. This text is then analyzed to place it into categories using syntactic features of the string (step 1904). Step 1906 is a branch depending on what category the text has been placed in. If the text is determined to be a URL or an equivalent it is used to retrieve the corresponding web page (step 1908). The web page is then displayed in the browser window (1910). If the text is categorized as something other than a URL it is passed to the natural language subsystem for processing (step 1912). In the preferred embodiment this involves translating the text into a query, resolving ambiguity and then executing the query as described above. The results of execution of this query are then displayed in the browser window (step 1914).

6.2 "Is MIT in the US?"

Figure 2:
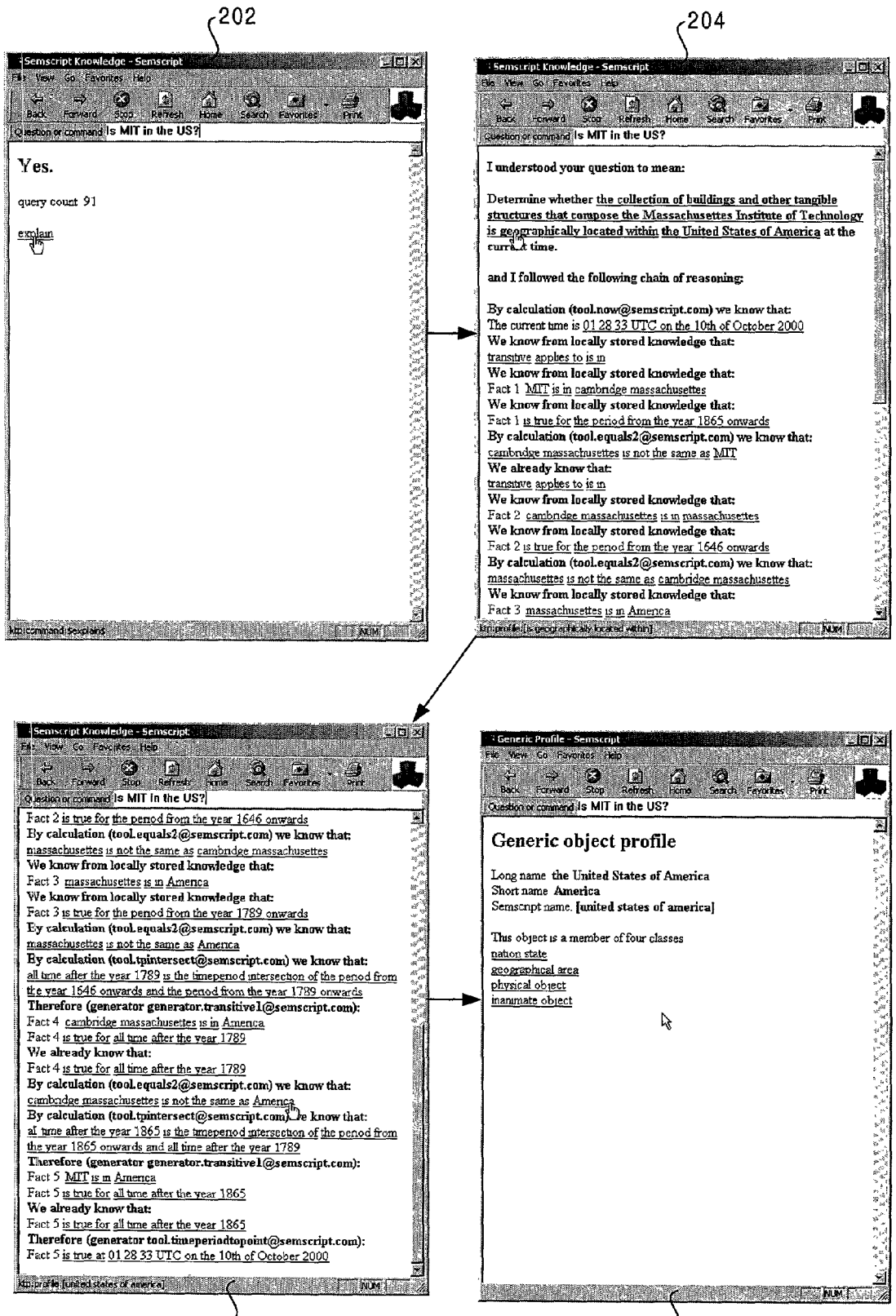
FIG. 2. shows a sequence of four screen shots of a web browser incorporating the invention. The first shows the software answering a Yes/No question. The second shows the result after the human operator requests an explanation of the answer by clicking on the "explain" link. The third shows the same windows after it has been scrolled to show the remaining lines. The fourth shows the results after the operator clicked on the link labeled "America" to produce an information screen on that object.

The results of entering this question is illustrated in FIG. 2. The string is retrieved from the URL line and the sequence "is" "MIT" "in" "the US" is found to match the following translation template:

"is" a b c
- -
query f1,f2,r
a [ns] f1
b [function] r
c [ns] f2
- -
query
[current time] [applies to] now
f: f1 r f2
f [applies at timepoint] now After substituting the matched strings into the header we get the query:

query f1,f2,r
["MIT"] [ns] f1
["in"] [function] r
["the US"] [ns] f2 which is run giving values for f1,f2 and r corresponding to the physical embodiment of MIT, the relation indicating geographical location and The USA respectively. These values are then substituted into the final query:

query
[current time] [applies to] now
f: [mit physical] [is geographically located within] [united states of America]
f [applies at timepoint] now which is checked for validity and then executed. It produces the answer "Yes" and an "explain" link which are displayed in the browser window (screen 202).

The "explain" link is ktp:command:$explain$ which is intercepted if clicked on and the explanation translated and printed in the browser window. The results of the user clicking on the explain link are shown in screen 204. As the explanation is too long to be displayed in entirety the user has to scroll down to see the end of the explanation and the results of doing this are shown in screen 206.

Notice how the explanation first involves a retranslation of the query back to English to prove that the original question was translated correctly. (In this case the original five-word question turns into an incredibly detailed 26-word equivalent.)

The precise reasoning path listing all the inference steps is also produced. When the step involves a (smart or dumb) generator, its name also appears.

All objects that appear in the translation and the explanation are hyperlinked using the ktp format. Clicking on one of them produces a profile screen of the object being mentioned including the long translation. (For convenience only the short translation is included in the explanation. The long translation is used in the translation of the query back to English.)

For example, clicking on "America" in screen 206 executes the command: ktp:profile:[united states of America]

The results of this are shown in screen 208. The template used is for the entire class of objects (the largest class in the ontology). Had a template existed for a more specific class of which [united states of America] was a member, that would have been used instead.

6.3 "Is Hillary Clinton Married to Tony Blair?"

Figure 3:
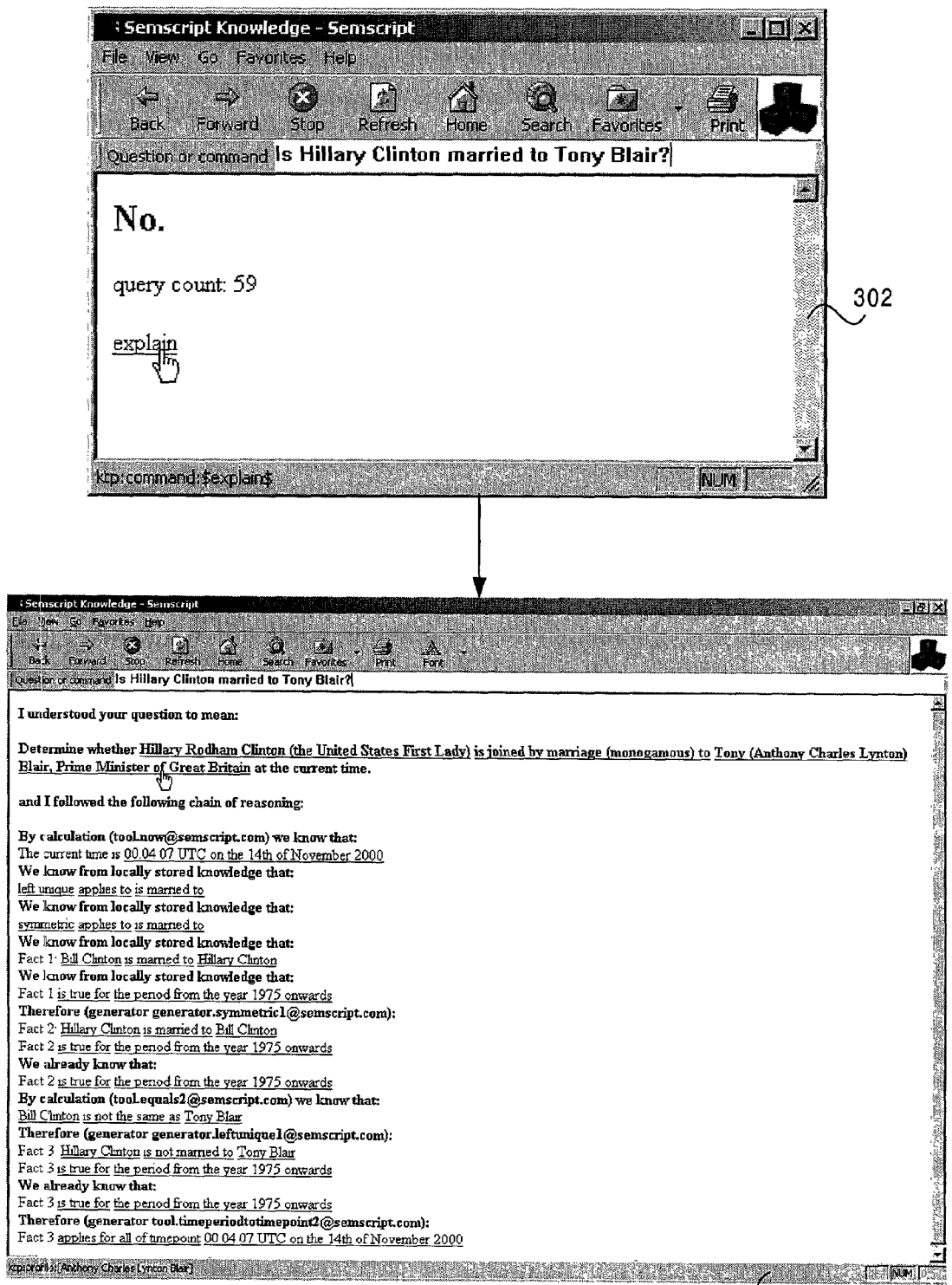
FIG. 3. shows a Yes/No question being answered with "No" and an explanation showing how the "no" answer was created by proving the opposite for an overlapping time period.

FIG. 3 illustrates this question. Screen 302 shows the response to the user entering the question and screen 304 shows the response to the user then subsequently clicking on the "explain" link. This example is how a "No" can be determined for a truth query. Clearly there is no specific knowledge answering this question in the database—there are billions of people who Hillary Clinton is not married to. The negative is inferred from other information and the engine's ability to create a breach of the golden rule from that information if one assumes that the answer to the question is "Yes".

Essentially, the translation of the question using templates is:
query
[current time] [applies to] now
t: [hillary Clinton] [is married to] [Anthony Charles Lynton Blair]
t [applies at timepoint] now The query is run in full mode and the engine initially is unable to justify the query meaning the answer is either "no" or "unknown". In order to distinguish between the two it takes the second line of the query (with the calculated value for now inserted) and its temporal partner and translates them into the following:
t: [hillary Clinton]~[is married to] [Anthony Charles Lynton blair]
t [applies for all of timepoint] [timepoint: ["2000/11/11/4/0"]]
essentially "Is Hillary Clinton not married to Tony Blair for all moments of time that lie within the description of the current time to the accuracy that the current time is specified?". As the engine is able to answer that in the affirmative (by using the property of marriage being [Left Unique] and knowing that she is married to Bill Clinton for all of this time point), it is able to answer a definitive "No" to the original query: If "Yes" was the answer to both queries then the golden rule would have been breached—a relation would exist and not exist between the same two objects for overlapping periods of time. Thus, the only possibility, is that the answer to the original query is "no". A more detailed description of this process is described above (2.8).

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. At least one computer-readable medium having computer program instructions embodied therein for interacting with at least one knowledge base, the at least one knowledge base having data stored therein representing first knowledge about a plurality of objects using a plurality of relationships between pairs of the objects, the computer program instructions comprising:

first computer program instructions operable to interact with the at least one knowledge base and, in response to a query having a predetermined format, generate second knowledge not represented in the at least one knowledge base from the first knowledge, the data representing the first knowledge including temporal data representing temporal validity for at least some of the relationships; and second computer program instructions operable to respond to the query using at least one of the first knowledge and the second knowledge.

2. The at least one computer-readable medium of claim 1 wherein the first computer program instructions are operable to infer the second knowledge with reference to the relationships.

3. The at least one computer-readable medium of claim 1 wherein at least a portion of the first and second computer program instructions are part of a plug-in application for use with a client browser application.

4. The at least one computer-readable medium of claim 1 wherein at least a portion of the first and second computer program instructions are part of a server-side application.

5. The at least one computer-readable medium of claim 1 wherein the computer program instructions further comprise third computer program instructions operable to generate the query.

6. The at least one computer-readable medium of claim 5 wherein the third computer program instructions are operable to generate the query in response to query data representing a natural language question.

7. The at least one computer-readable medium of claim 6 wherein the natural language question is entered as a text string into a URL window in a browser environment, the third computer program instructions further being operable to determine whether the text string is a URL or the query data.

8. The at least one computer-readable medium of claim 5 wherein the third computer program instructions are operable to translate a natural language question into the query by generating at least one sub-string from a string of text corresponding to the natural language question, and selecting at least one of a plurality of query template components corresponding to the at least one sub-string to generate the query.

9. The at least one computer-readable medium of claim 8 wherein the third computer program instructions are further operable to substitute the selected query template components into variables associated with a query generator execution of which generates the query.

10. The at least one computer-readable medium of claim 8 further comprising fourth computer program instructions operable to generate a query template including the plurality of query template components by designating a plurality of predefined text sub-strings and a plurality of variables to which the predefined text sub-strings correspond, and by defining a query generator with respect to the variables, the query generator being operable to generate the query from selected ones of the predefined text sub-strings being substituted for the corresponding variables.

11. The at least one computer-readable medium of claim 5 wherein the third computer program instructions are further operable to generate a plurality of query candidates including the query.

12. The at least one computer-readable medium of claim 11 wherein the third computer program instructions are further operable to reject selected ones of the plurality of query candidates with reference to the knowledge base.

13. The at least one computer-readable medium of claim 11 wherein the third computer program instructions are further operable to present the plurality of query candidates for selection of the query.

14. The at least one computer-readable medium of claim 1 wherein the computer program instructions further comprise third computer program instructions operable to generate a natural language response to the query with reference to selected ones of the plurality of objects.

15. The at least one computer-readable medium of claim 14 wherein the third computer program instructions are operable to generate the natural language response with reference to translation objects associated with the selected objects in the knowledge base.

16. The at least one computer-readable medium of claim 15 wherein the translation objects comprise common translation objects and unique translation objects, the common translation objects relating an associated one of the selected objects with a common translation for the associated selected object, and the unique translation objects relating an associated one of the selected objects with a unique translation for the associated object.

17. The at least one computer-readable medium of claim 1 wherein the first computer program instructions are operable to implement a plurality of inference generators each of which is operable to generate facts not represented in the knowledge base with reference to at least one of the plurality of objects and at least one potential fact associated with the inference generator.

18. The at least one computer-readable medium of claim 17 wherein some of the plurality of inference generators are operable to generate facts with reference to the associated objects, the relationships corresponding to the associated objects, and the associated potential facts, and without reference to any processes external to the inference generator.

19. The at least one computer-readable medium of claim 17 wherein some of the plurality of inference generators are operable to generate facts with reference to the associated objects, the relationships corresponding to the associated objects, and the associated potential facts, and only after performing at least one additional operation using a at least one process external to the inference generator.

20. The at least one computer-readable medium of claim 1 wherein the data representing the first knowledge comprises a plurality of fact representations each corresponding to a relationship between a pair of the plurality of objects, each fact representation including a first object name corresponding to a first one of the plurality of objects, a second object name corresponding to a second one of the plurality of objects, and a relation object name identifying a relation object which defines the relationship between the first and second objects, and wherein the first computer program instructions are operable to infer the second knowledge with reference to the relationships.

21. A computer-implemented method for interacting with at least one knowledge base, the at least one knowledge base having data stored therein representing first knowledge about a plurality of objects using a plurality of relationships between pairs of the objects, the method comprising:
    interacting with the at least one knowledge base and, in response to a query having a predetermined format, generating second knowledge not represented in the at least one knowledge base from the first knowledge, the data representing the first knowledge including temporal data representing temporal validity for at least some of the relationships; and
    responding to the query having a predetermined format using at least one of the first knowledge and the second knowledge.

22. The method of claim 21 wherein the second knowledge is inferred with reference to the relationships.

23. The method of claim 21 further comprising generating the query.

24. The method of claim 23 wherein the query is generated in response to query data representing a natural language question.

25. The method of claim 24 wherein the natural language question is entered as a text string into a URL window in a browser environment, the method further comprising determining whether the text string is a URL or the query data.

26. The method of claim 23 further comprising translating a natural language question into the query by generating at least one sub-string from a string of text corresponding to the natural language question, and selecting at least one of a plurality of query template components corresponding to the at least one sub-string to generate the query.

27. The method of claim 26 further comprising substituting the selected query template components into variables associated with a query generator execution of which generates the query.

28. The method of claim 26 further comprising generating a query template including the plurality of query template components by designating a plurality of predefined text sub-strings and a plurality of variables to which the predefined text sub-strings correspond, and by defining a query generator with respect to the variables, the query generator being operable to generate the query from selected ones of the predefined text sub-strings being substituted for the corresponding variables.

29. The method of claim 23 further comprising generating a plurality of query candidates including the query.

30. The method of claim 29 further comprising rejecting selected ones of the plurality of query candidates with reference to the knowledge base.

31. The method of claim 29 further comprising presenting the plurality of query candidates for selection of the query.

32. The method of claim 21 further comprising generating a natural language response to the query with reference to selected ones of the plurality of objects.

33. The method of claim 32 further comprising generating the natural language response with reference to translation objects associated with the selected objects in the knowledge base.

34. The method of claim 33 wherein the translation objects comprise common translation objects and unique translation objects, the common translation objects relating an associated one of the selected objects with a common translation for the associated selected object, and the unique translation objects relating an associated one of the selected objects with a unique translation for the associated object.

35. The method of claim 21 further comprising implementing a plurality of inference generators each of which is operable to generate facts not represented in the knowledge base with reference to at least one of the plurality of objects and at least one potential fact associated with the inference generator.

36. The method of claim 35 wherein some of the plurality of inference generators are operable to generate facts with reference to the associated objects, the relationships corresponding to the associated objects, and the associated potential facts, and without reference to any processes external to the inference generator.

37. The method of claim 35 wherein some of the plurality of inference generators are operable to generate facts with reference to the associated objects, the relationships corresponding to the associated objects, and the associated potential facts, and only after performing at least one additional operation using a at least one process external to the inference generator.

38. The method of claim 21 wherein the data representing the first knowledge comprises a plurality of fact representations each corresponding to a relationship between a pair of the plurality of objects, each fact representation including a first object name corresponding to a first one of the plurality of objects, a second object name corresponding to a second one of the plurality of objects, and a relation object name identifying a relation object which defines the relationship between the first and second objects, and wherein the method further comprises inferring the second knowledge with reference to the relationships.

39. A system for storing and retrieving information from a knowledge base, comprising:

at least one memory having data corresponding to the knowledge base stored therein representing first knowledge about a plurality of objects using a plurality of relationships between pairs of the objects and temporal data representing temporal validity for at least some of the relationships; and at least one central processing unit operable in association with the at least one memory to interact with the at least one knowledge base and, in response to a query having a predetermined format, generate second knowledge not represented in the at least one knowledge base from the first knowledge, and respond to the query using at least one of the first knowledge and the second knowledge.

40. The system of claim 39 wherein the at least one memory and the at least one central processing unit are connected via a memory bus.

41. The system of claim 39 wherein the at least one memory and the at least one central processing unit are connected via a local area network.

42. The system of claim 39 wherein the at least one memory and the at least one central processing unit are connected via a wide area network.

* * * * *